US006730236B2

(12) United States Patent  
Kouba

(10) Patent No.: US 6,730,236 B2
(45) Date of Patent: May 4, 2004

(54) METHOD FOR SEPARATING LIQUIDS IN A SEPARATION SYSTEM HAVING A FLOW COALESCING APPARATUS AND SEPARATION APPARATUS

(75) Inventor: Gene Edward Kouba, Katy, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 10/036,795

(22) Filed: Nov. 8, 2001

(65) Prior Publication Data

US 2003/0085185 A1 May 8, 2003

(51) Int. Cl.[7] .............................................. B01D 17/038
(52) U.S. Cl. ...................... 210/806; 210/787; 210/788; 210/800; 210/304; 137/625.3; 137/810; 137/813; 166/91.1; 166/265; 166/267; 166/369; 166/373
(58) Field of Search ................................ 210/787, 788, 210/806, 800, 304; 137/625.3, 810, 813; 166/265, 267, 369, 373, 91.1; 251/118

(56) References Cited

U.S. PATENT DOCUMENTS

| 3,972,819 A | 8/1976 | Pielkenrood ................ 210/513 |
| 4,046,698 A | 9/1977 | Pielkenrood ................ 210/513 |
| 4,133,771 A | 1/1979 | Pielkenrood ................ 210/513 |
| 4,203,843 A | 5/1980 | Carlstedt ..................... 210/262 |
| 4,383,914 A | 5/1983 | Kizior ......................... 208/177 |
| 4,396,504 A | 8/1983 | Tannehill ...................... 210/86 |
| 4,411,791 A | 10/1983 | Ward .......................... 210/649 |
| 4,617,031 A | 10/1986 | Suh et al. |
| 4,820,414 A | 4/1989 | Carroll et al. ............ 210/512.1 |
| 4,869,814 A | 9/1989 | Hughes et al. ............... 210/142 |
| 4,948,517 A | 8/1990 | Young et al. ................ 210/767 |
| 5,252,229 A | 10/1993 | Rojey et al. ................. 210/787 |
| 5,366,641 A | 11/1994 | Hadfield et al. ............. 210/739 |
| 5,565,078 A * | 10/1996 | Sams et al. .................. 204/671 |
| 5,565,101 A | 10/1996 | Kuntz ......................... 210/304 |
| 5,575,896 A | 11/1996 | Sams et al. .................. 204/564 |
| 5,616,244 A | 4/1997 | Seureau et al. ............. 210/295 |
| 5,685,374 A * | 11/1997 | Schmidt et al. ............. 166/369 |
| 5,714,048 A | 2/1998 | Edmondson ................ 204/563 |
| 5,965,021 A * | 10/1999 | Hesse et al. ............. 210/512.1 |
| 5,979,558 A * | 11/1999 | Bouldin et al. ............. 166/373 |
| 6,105,614 A * | 8/2000 | Bohaychuk et al. ..... 137/625.3 |

FOREIGN PATENT DOCUMENTS

CA          1 223 791          7/1987 ................ 134/54

OTHER PUBLICATIONS

F. J. op ten Noorth, J. P. Etten, R. S. Donders, "Reduction of Residual Oil Content in Produced Water at Offshore Gas Production Platform P/6A," SEC—Society of Petroleum Engineers, pp. 9–18, (1990).

(List continued on next page.)

Primary Examiner—David A. Reifsnyder
(74) Attorney, Agent, or Firm—Richard J. Schulte

(57) ABSTRACT

A flow conditioning apparatus, a separation system which includes the flow conditioning apparatus and cooperating downstream separation equipment, and a method of using the system are described. The system separates liquid components of differing densities from a fluid mixture. The flow conditioning apparatus includes an inlet, an outlet, and a swirl chamber extending along a swirl axis. The inlet and outlet cooperate with the swirl chamber to create a swirling of a fluid mixture passing through the swirl chamber to ideally induce coalescence of liquid droplets. The inlet and the outlet typically direct fluid to flow in a circumferential direction relative to the swirl axis to create a helical flow. The flow of the fluid mixture through the apparatus encounters a minimum of fluid shear and associated droplet dispersion. The enhanced quantity of droplets coalesced, or at least the quantity of pre-existing droplets entering the control apparatus which are not substantially dispersed by fluid shear, increases the efficiency of liquid separation by the cooperating downstream separation equipment.

23 Claims, 15 Drawing Sheets

OTHER PUBLICATIONS

Guy R. Carriere, Fred Rodriguez, Roy D. Lister, "Comparison of Oil/Water Separation Results Between Coalescing, Gas Sparging, and Hydrocyclone Systems for Produced Water Applications," pp. 1–4, (1996).

Arne Myrvang Gulbraar, Jan Hoydal, "State of the Art Separator Internals: G–Sep™ CCI—Compact Cyclonic Inlet Device," *Scandinavian Oil–Gas Magazine*, pp. 1–3, (1998).

Dr. Alastair Sinker, Mr. Mark Humphris, Mr. Nick Wayth, "PECT–F: A Novel Pre–Coalescence Technology to Improve Deoiling Hydrocyclone Efficiency," $3^{rd}$ *IBC Water Management Offshore*, pp. 1–12, (1999).

P. J. Nilsen, K. Haugen, M. Lingelem, B. Strand, R. Sandberg, "A Novel Separator Inlet Design," (1999).

Anne Finborud, Mark Faucher, Erik Sellman, "New Method for Improving Oil Droplet Growth for Separation Enhancement," SPE International—Society of Petroleum Engineers, (1999).

A. B. Sinker, M. Humphris, N. Wayth, "Enhanced Deoiling Hydrocyclone Performance Without Resorting to Chemicals," SPE International—Society of Petroleum Engineers, (1999).

Arne Myrvang Gulbraar, Jan Hoydal, "Latest Experiences from Adopting the G–Sep™ CCI (Compact Cyclone Inlet) to Statfjord B Separators," Production Separation Systems Forum, pp. 1–12, (1998).

K. Sury, C. Grant, R. Ridley, "Long Distance Pipelining of Bituminous Froth," $47^{th}$ Annual Technical Meeting of the Petroleum Society, pp. 1–11 (1996).

* cited by examiner

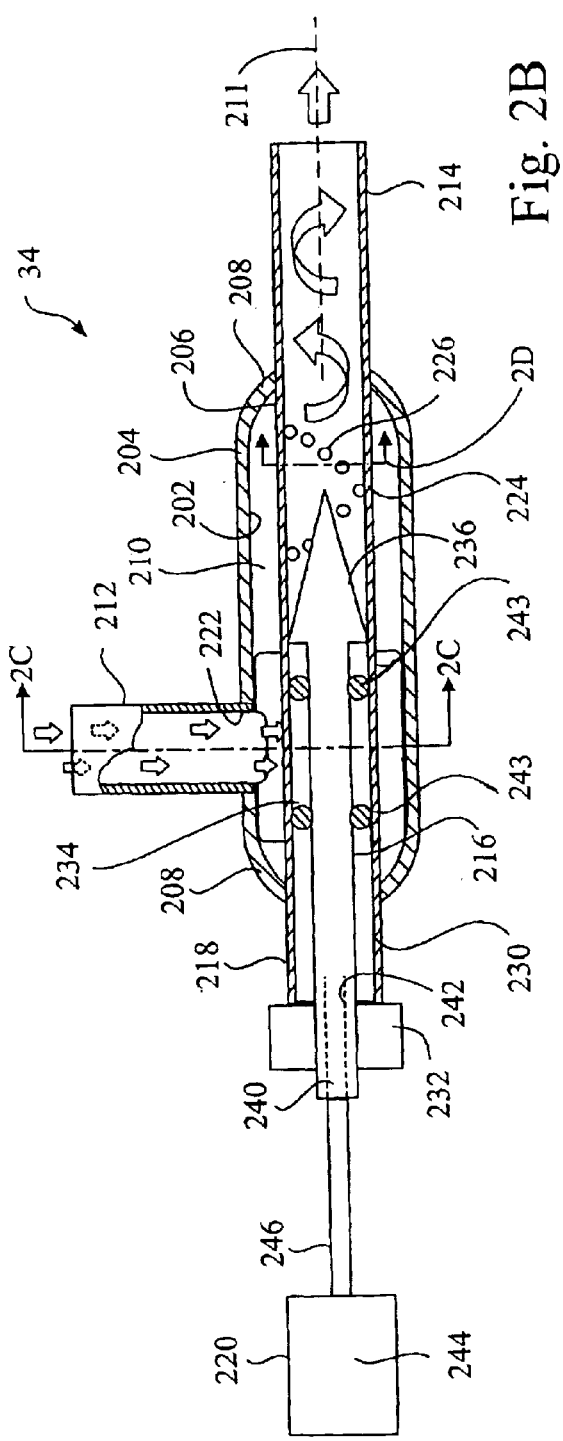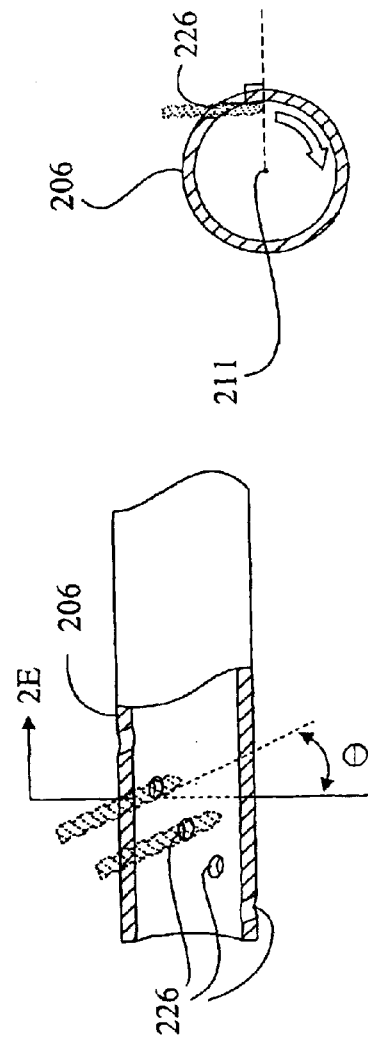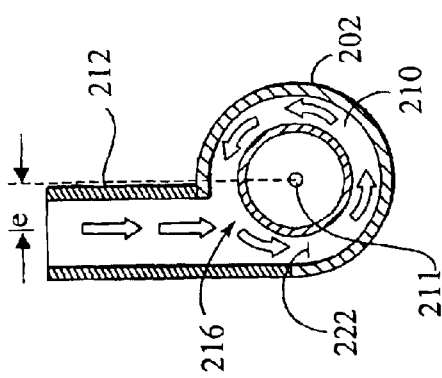

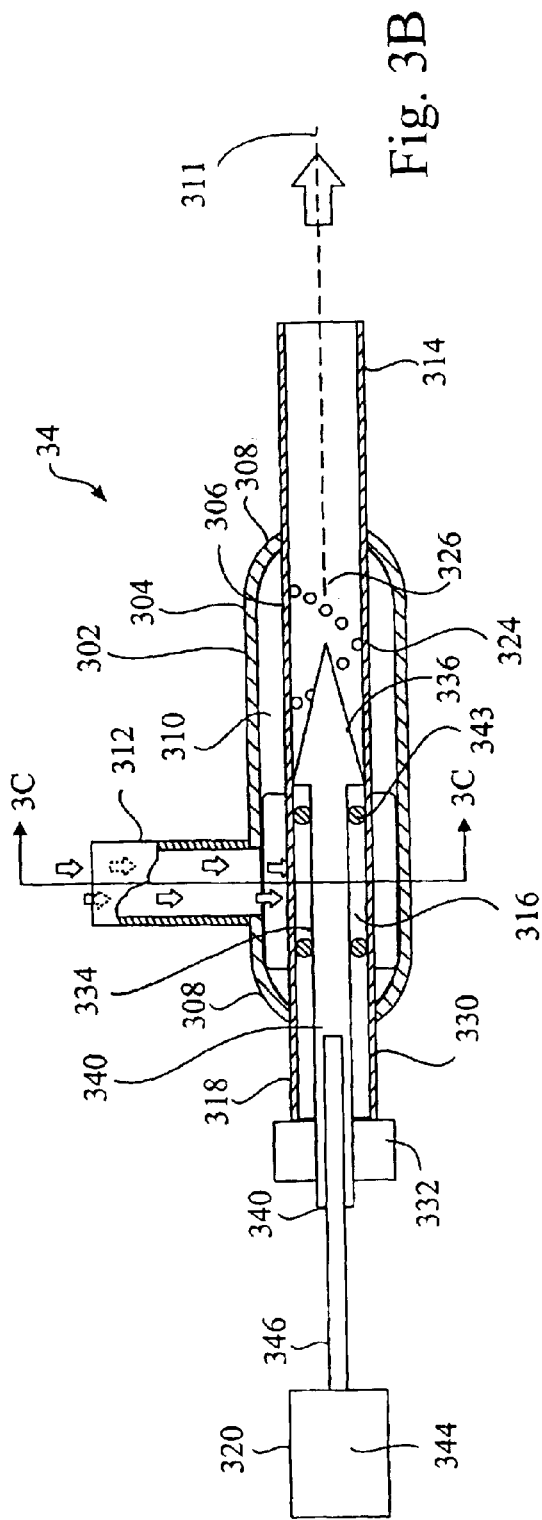
Fig. 3B
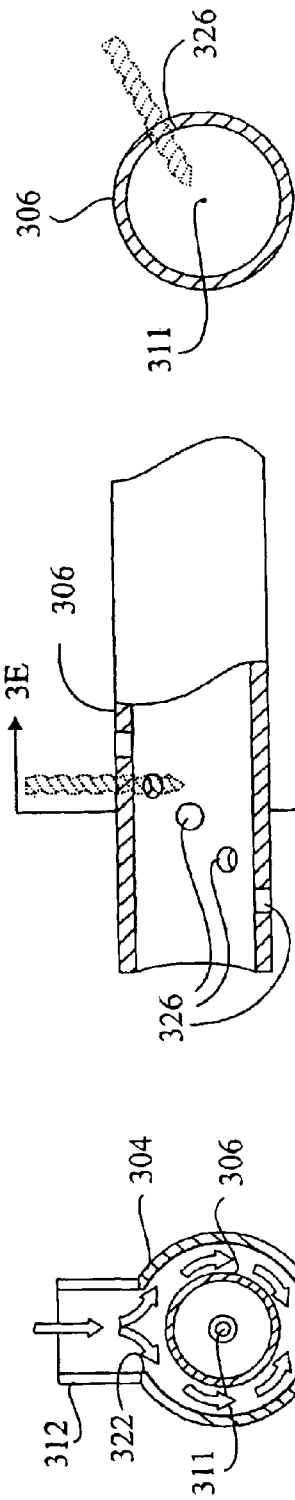
Fig. 3D
Fig. 3E
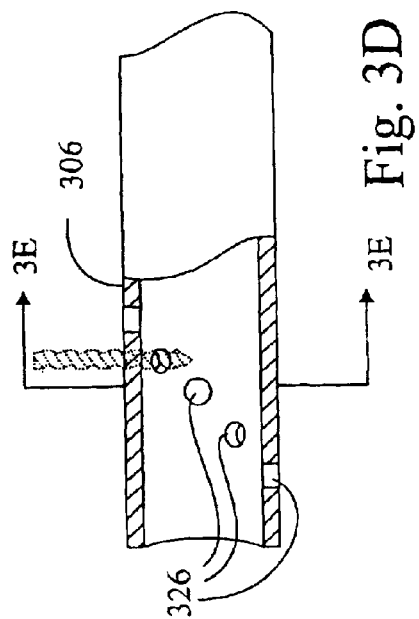
Fig. 3C

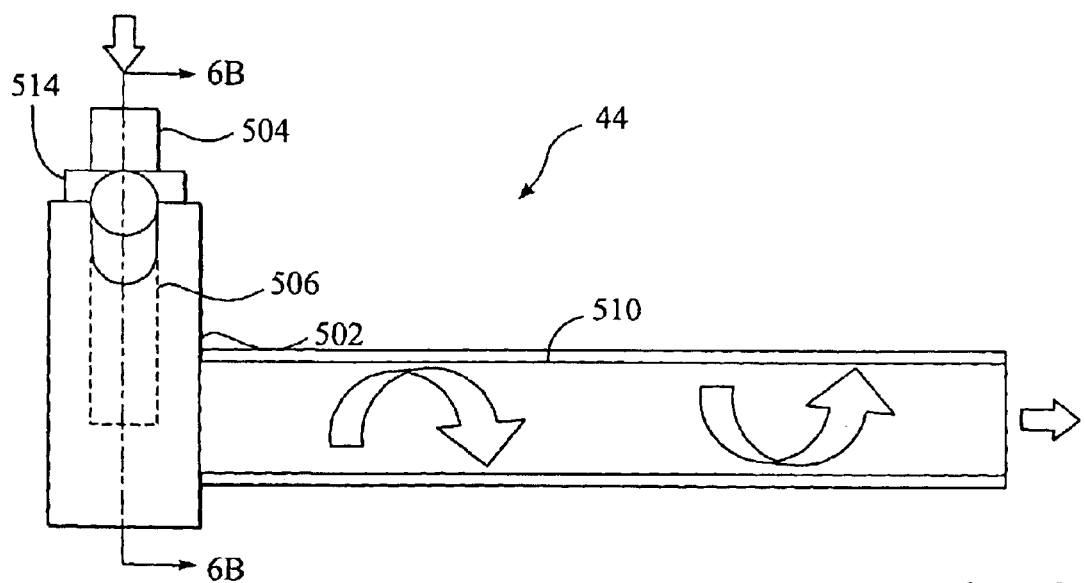
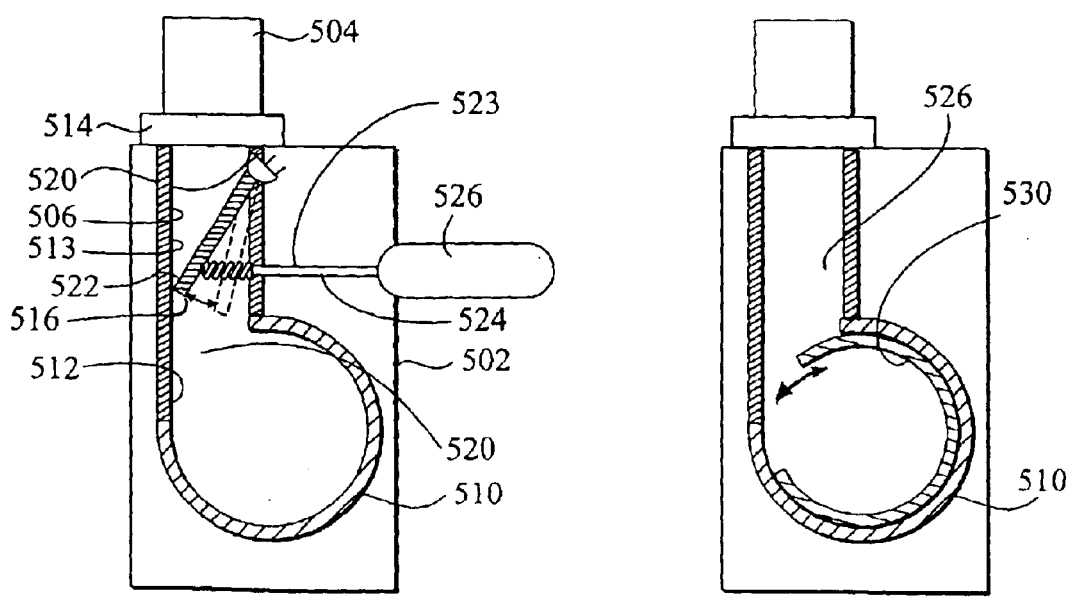
Fig. 6A
Fig. 6B          Fig. 6C

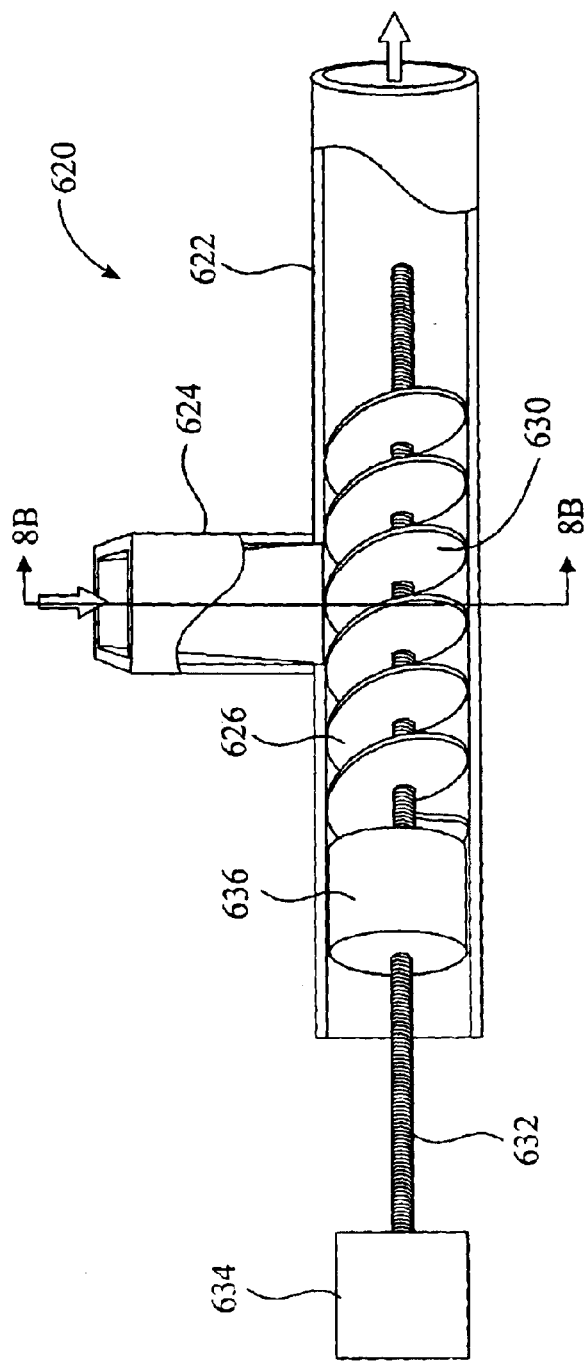
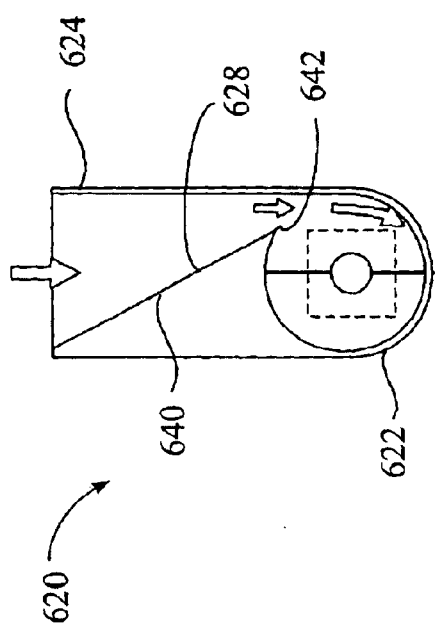
Fig. 8A
Fig. 8B

METHOD FOR SEPARATING LIQUIDS IN A SEPARATION SYSTEM HAVING A FLOW COALESCING APPARATUS AND SEPARATION APPARATUS

FIELD OF INVENTION

The present invention relates generally to flow control apparatus and to systems and methods employing the same which are used to separate fluids of differing densities, and more particularly, to equipment used to separate gases and liquids during the production and refining of hydrocarbons such as natural gas and oil.

BACKGROUND OF THE INVENTION

Many fluid flow systems require the separation of fluids having components of differing densities. A prime example is in the production and refining of hydrocarbon liquids and gases. These production fluids often include natural gas, carbon dioxide, oil, water, nitrogen, hydrogen sulfide, and helium along with other fluid and solid contaminants. At some point, it is necessary to separate gases from liquids and water from oil in order to measure, transport, or process the hydrocarbon fluids. A significant shortcoming to most pipeline transport and separation systems is that they employ flow control apparatus which tend to shear and disperse coalesced droplets and stratified layers of fluid components when a fluid mixture passes through the flow control apparatus. This adversely affects the ability of a cooperating downstream separation apparatus to separate fluids of differing densities.

Initially, production fluids are withdrawn from wells drilled in the earth. The production fluids are typically transported to a gas separator where free gas is removed. The liquid then passes to an oil/water separator where most of the water is removed. Examples of conventional gas separators include horizontal and vertical gravity separators and gas/liquid cylindrical cyclones. Examples of conventional liquid separators include horizontal gravity separators, free water knock-outs, liquid/liquid hydrocyclones, and flotation devices.

Various flow control apparatus are used in these gas and liquid separation systems to control the flow of the production fluids. For example, production fluids may be produced from wells at very high pressures. Downstream processing equipment is generally not built robust enough to handle these high pressures in order that the processing equipment may be built economically. Consequently, pressure reducing chokes must be incorporated into the system between the well and downstream processing equipment. Control valves, check valves and other control apparatus are also used to control the flow rate of the production fluids from a well. Other examples of flow control apparatus include homogenizers, mixers, pumps, elbows, venturis, orifice plates, etc. Similarly, the processing of hydrocarbons in refineries often employs many of these same flow control apparatus.

There is a natural tendency for gravity to separate fluid components of differing densities and to concentrate fluids of similar densities, if the fluid flow is sufficiently quiet and given adequate residence time. Further, there is a tendency for droplets in a dispersed phase to coalesce given close enough proximity and adequate contact time for film drainage to remove the fluid barrier between droplets. Separation equipment which is employed to separate fluids of differing densities, such as water and oil, generally operate much more effectively if dispersed droplets in the incoming fluids are large, able to coalesce, stratify and pre-separate prior to entering the separation equipment.

However, the use of conventional flow control apparatus in these separation systems tends to shear and disperse droplets and destratify layers of separated components. Mechanically, this occurs because these flow control apparatus are typically designed such that there is a rapid change in both the flow rate and direction of a fluid mixture passing through the flow control apparatus with energy being dissipated into the fluid. As the rate of energy dissipation per unit volume is increased, smaller droplets are generally created. The shear forces induced during passage through these conventional flow control apparatus tend to tear apart and disperse any stratified layers of fluid which have formed and also disperse large clumps or droplets of one fluid component into another. Likewise, in severe situations, coalesced droplets of oil and water may also be broken up into tiny or microscopic droplets and dispersed under the shear stresses imparted by their passage through these flow control apparatus. Consequently, fluid passage through conventional flow control apparatus often results in the breakup and dispersion of separated layers and coalesced droplets and even in the formation of emulsions. According to Stokes Law, the velocity of a droplet of one fluid falling or rising through another is proportional to the droplet size. Thus, the use of these conventional flow control apparatus in separation systems may be counterproductive to the end goal of producing separated fluids.

Another drawback to conventional flow conditioning equipment is that they are highly susceptible to erosion and wear. Particles, such as sand, which impact components at high velocities and generally perpendicular to a surface, can cause significant wear on the equipment. It would be desirable to extend the life of such equipment by reducing this erosion and wear.

As a specific example, conventional chokes, used to provide pressure letdown, are notorious for breaking up droplets, increasing phase dispersion, worsening emulsions, and eroding in the presence of sand. The extent to which a choke can worsen fluid separation is difficult to predict in advance. Therefore, separation apparatus are often grossly oversized to compensate for the uncertainty of the dispersion effect of the choke or, worse, undersized if the effect of the choke is not adequately accounted for. If dispersion of coalesced droplets is sufficiently severe, chemicals such as deemulsifiers may have to be added to the water and oil mixture to assist in the separation process. Further, in some instances, heat may have to be added to enhance separation. Moreover, these separation apparatus may be mounted in remote areas such as on the sea floor or on an offshore platform where size and weight are important. Consequently, it is desirable to keep separation apparatus as small and light in weight as possible while still achieving a desired level of separation.

Accordingly, there is a need for flow control apparatus which work in cooperation with downstream separation apparatus to minimize the shearing or breaking up of oil layers and droplets in an oil and water mixture during hydrocarbon production and processing. Similarly, other industries, which use flow control apparatus like those described above to separate components in a fluid mixture, also face comparable problems. The present invention reduces the aforementioned shortcomings of many of these separation systems employing conventional flow control apparatus, and in particular, in those systems used in the processing of hydrocarbons.

SUMMARY OF THE INVENTION

The present invention includes a mechanical flow conditioning technology for the purpose of improving downstream separation of oil, water and gas. The technology involved is based on the concepts of reducing the forces that break up droplets, and swirling the bulk flow to enhance coalescence of the dispersed phase. Centrifugal forces in the swirling flow field segregate fluid components according to density and cause droplets to crowd together allowing coalescence of multiple droplets into larger droplets. According to Stokes law, droplets with larger diameters will move through a continuous fluid faster and will consequently separate more quickly. Incorporating this technology can result in improved performance from existing separators or allow the use of smaller separators to perform the same duty. Such minimization of separator size is quite desirable when a separator is used in offshore or sea floor separation settings where size and weight reduction are at a premium.

A "coalescing or flow conditioning choke" design is disclosed which produces a pressure drop through a combination of series and parallel swirl producing components. Droplet size is inversely proportional to the square of impact velocity. Impact velocity is the relative velocity between impacting fluids or between a fluid and a wall. The coalescing choke design of the present invention keeps this impact velocity small by orienting pressure dissipating orifices to direct fluid passing therethrough to swirl helically and along the inner periphery of a receiving chamber. Accumulating pressure losses are achieved through a series of successive orifices or other flow restrictions rather than taking one large loss through a single opening as is typical of conventional chokes. This gradual, as opposed to abrupt, pressure drop through orifices reduces the rate of energy dissipation per unit volume which helps maintain droplets in a coalesced state or at least minimizes breakup and dispersion. Further, the strong fluid rotation produced by this configuration reduces the relative velocity differential between droplets or stratified layers of incoming fluid and generates a centrifugal field, which can greatly enhance droplet coalescence. Such a flow control apparatus has been demonstrated to significantly reduce the time required to separate oil and water in a downstream separator as compared to using a similar non-coalescing choke design in a like separation system This principle of minimizing velocity differentials between fluid components and maximizing centrifugal forces in a swirl chamber can be incorporated into the design of other devices, e.g., control valves, swirl vanes, piping elbows and fittings, to enhance coalescence and improve performance of downstream separation apparatus.

A flow conditioning and separation system for separating liquid components of differing densities from a fluid mixture is disclosed. The system comprises a flow conditioning apparatus and a cooperating liquid separation apparatus disposed downstream from and in fluid communication with the flow conditioning apparatus. The flow conditioning apparatus has an inlet, an outlet, and a swirl chamber extending along a curvilinear swirl axis. The inlet and outlet are configured to cooperate with the swirl chamber to induce the swirling of a fluid mixture about the swirl axis such that when a fluid mixture having liquid components of differing densities passes through the swirl chamber, centrifugal forces are imparted upon the liquid components to enhance coalescence or at least minimize dispersion of droplets in at least one of the liquid components. The liquid separation apparatus is capable of separating liquids of differing densities. The enhanced quantity of coalesced droplets in a fluid mixture received from the cooperating upstream flow conditioning apparatus by the separation apparatus increases the separation efficiency of the separation system over a system which does not use a flow conditioning apparatus.

Ideally, the inlet and the outlet direct fluid to flow generally circumferentially within the swirl chamber to create a helical swirling motion about the swirl axis. At least one of the inlet and the outlet may include a plurality of orifices which have peripheries which are elongate and curved and allow a fluid mixture to pass therethrough directed generally in a circumferential direction relative to the swirl axis.

The flow control apparatus may serve as a choke to reduce pressure, a flow control valve to control the rate of flow through the flow control apparatus or else as an elbow to help redirect the direction of flow. The inlet and outlet may include a plurality of orifices in series and/or in parallel. Further, a movable closure in the flow conditioning apparatus may be used to control flow rate. Moreover, methods employing such flow control apparatus to separate fluid components of differing densities in a separation system are also within the scope of the present invention.

It is an object of the present invention to provide a separation system which is compact in size and low in weight, yet is efficient in separating fluid components of differing densities by employing a flow conditioning apparatus in the separation system upstream from a cooperating separation apparatus.

It is another object to increase the efficiency of separation systems by employing flow control apparatus which preferably enhance the coalescence, or at least minimize the dispersion, of droplets of liquids passing through the flow control apparatus before reaching a cooperating separation apparatus which separates fluids of differing densities.

It is yet another object to provide a flow conditioning apparatus which includes an inlet, an outlet, and a swirl chamber which are configured to induce a fluid mixture to swirl, preferably helically, when passing through the swirl chamber to impart centrifugal forces on fluid components of differing densities thereby enhancing coalescence of droplets and stratification of layers of the fluid mixture.

An additional object is to provide a flow conditioning apparatus which includes an inlet, an outlet and a swirl chamber wherein the inlet and the outlet are configured to direct fluid flow generally tangential to the surface enclosed by the swirl chamber, thereby minimizing the rate of change of direction of fluid flow and relative velocity differentials between droplets and stratified layers of fluid components passing through the flow control apparatus.

It is still a further object to provide fluid conditioning apparatus which minimizes the maximum velocity of particles flowing through fluid conditioning equipment to thus reduce wear and extend the life of the equipment.

An additional object is to provide a flow conditioning choke apparatus which significantly reduces the pressure of fluid passing therethrough while minimizing the shearing of fluids to maximize the size of droplets of immiscible fluid components exiting the flow conditioning choke apparatus.

Moreover, it is an object to provide a system for separating hydrocarbons from water in a separation system where an upstream flow conditioning apparatus minimizes fluid shear to enhance droplet size and stratification of layers of fluids of differing densities such that a downstream separation apparatus may more effectively separate the water from the hydrocarbons and be made of a minimum weight and of a minimum footprint.

BRIEF DESCRIPTION OF THE DRAWINGS

These and other objects, features and advantages of the present invention will become better understood with regard to the following description, pending claims and accompanying drawings where:

FIGS. 2A–E are schematic drawings of a coalescing or flow conditioning choke, respectively showing a partially cutaway perspective view, a longitudinal sectional view, a sectional view taken along line 2C—2C of FIG. 2B, a fragmentary section from FIG. 2B of an inner cylinder with orifices, and a sectional view taken along line 2E—2E of FIG. 2D;

FIGS. 3A–E, respectively, are schematic drawings of a non-coalescing choke, respectively showing a partially cutaway perspective view, a longitudinal sectional view, a sectional view taken along line 3C—3C of FIG. 3B, an enlarged fragmentary view of a portion of an inner cylinder with radially opening orifices, and a sectional view taken along line 3E—3E of FIG. 3D;

FIGS. 6A–C are schematic drawings of a coalescing or flow conditioning control valve including a side elevational view, partially cutaway, a cross-sectional view taken along line 6B—6B of FIG. 6A showing a movable diverter plate, and a comparable cross-sectional view of an alternative control valve having a rotary vane which replaces the diverter plate for controlling flow rate through the control valve;

FIGS. 8A–B are an elevational view, partially cutaway, and a sectional view taken along line 8B—8B of FIG. 8A showing a variable choke or valve with a tangential inlet and screw mounted vane;

BEST MODE(S) FOR CARRYING OUT THE INVENTION

The present invention includes separation systems and methods which utilize flow conditioning apparatus to coalesce droplets, or at least minimize fluid shear and dispersion, in fluid mixtures flowing through the flow control apparatus. The fluid mixtures with enlarged droplets increase the operational effectiveness of downstream cooperating separation apparatus in separating components of differing densities from the fluid mixtures. Most preferably, the flow conditioning apparatus, systems and methods are used to separate oil from water during oil production from a well. However, the flow conditioning apparatus may be used in other applications, including, but not limited to, hydrocarbon refining, food processing, environmental treatment of water, separation of components of machining coolants, etc.

Figure 1A:
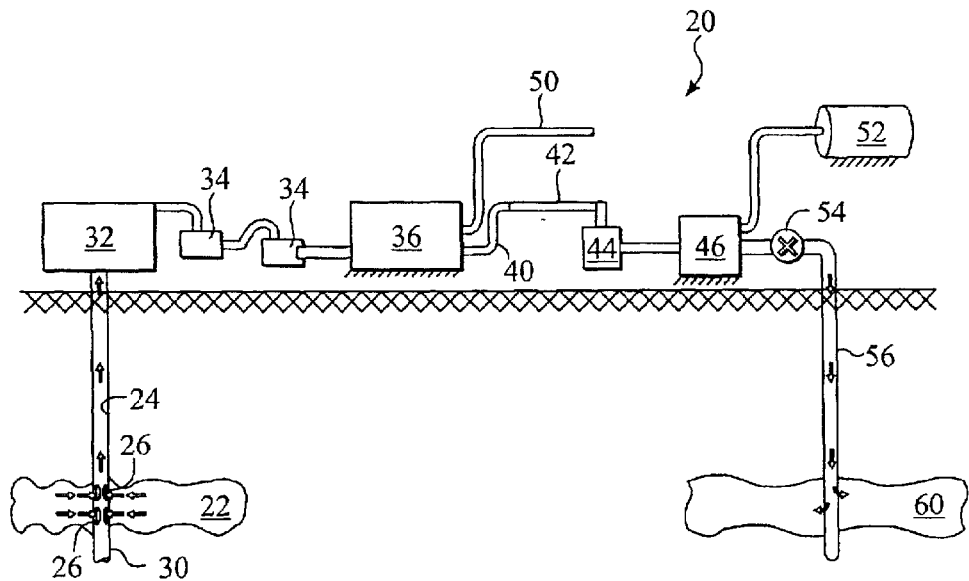
FIG. 1A is a schematic drawing of a land mounted separation system employing flow conditioning apparatus, made in accordance with the present invention, which separate gases from liquids and oil from water.

FIG. 1A illustrates an exemplary separation system 20, made in accordance with the present invention, which incorporates numerous flow conditioning apparatus. In this first embodiment, separation system 20 is mounted on land. Separation system 20 preferably separates gases and liquids and water and oil from production fluids produced from an underground formation 22 through a wellbore 24. Perforations 26 in a casing 30 allow production fluids to pass into wellbore 24 and out through a wellhead 32. Gases, oil and water are separated on the land surface utilizing separation system 20.

Separation system 20 includes a pair of coalescing chokes 34, a gas separator 36, a coalescing elbow 40, a coalescing conduit 42, a coalescing control valve 44, and a water/oil separator 46. Gas is removed by way of a gas pipeline 50 for further processing at other facilities (not shown) and separated oil may be stored in storage tank 52. Alternatively, the gas could be temporarily stored in a gas storage tank and the separated oil could be piped directly to other processing facilities such as a refinery (not shown). A valve 54 controls the disposal of water into a disposal well 56, which delivers the water into a disposal formation 60.

The flow conditioning apparatus, i.e., coalescing choke 34, coalescing elbow 40, coalescing conduit 42 and coalescing control valve 44, will be described individually in greater detail below. These flow conditioning apparatus operate on the principles of reducing the forces that break up droplets and swirling the bulk flow to enhance coalescence of the dispersed phase of the production fluids or fluid mixtures. The centrifugal forces in the swirling fluid mixture segregate the fluid components according to density and cause the droplets to crowd together allowing coalescence of multiple droplets into larger droplets. Incorporating this technology upstream from a cooperating separator or separation apparatus can result in improved performance from existing separators or allows the use of smaller separators to perform the same duty.

For purposes of this specification, "cooperating" means that a flow conditioning apparatus significantly increases the size of droplets leaving a flow conditioning apparatus relative to conventional and comparable flow control apparatus and that the separation apparatus is in sufficiently close fluid proximity to the separation apparatus that the effectiveness and/or efficiency of the overall separation system is significantly enhanced. For example, the time to reach a desired level of liquid separation in a gravity separator may be reduced by more than 10%, preferably more than 25%, and even more preferably greater than 50% relative to using a non-flow conditioning apparatus. If the flow control apparatus and downstream separation apparatus are so far apart that fluid components of differing densities would naturally segregate in the connecting conduits under the influence of gravity such that the use of flow conditioning members makes no significant difference in separation time, then the flow conditioning members and downstream separator are not deemed to be "cooperating".

In operation, production fluids flow from production formation 22 through perforations 26 into wellbore 24. The production fluids flow up wellbore 24 and out through wellhead 32. The production fluids often leave wellhead 32 at very high pressures. To protect downstream components, e.g., pipeline and separation systems, coalescing chokes 34 are used to reduce or step down pressure. If the pressure drop across a single coalescing choke 34 is not sufficient, a series of coalescing chokes 34, as shown in FIG. 1A, may be used to achieve a desired pressure drop.

The production fluid, now at a lower pressure, is passed to gas separator 36. Gas separator 36 in this preferred embodiment is a conventional horizontal separator. An alternative gas separator which may be used includes a gas-liquid cylindrical cyclone (GLCC) separator. The gas separated in separator 36 is passed to gas pipeline 50 for transport. Alternatively, the separated gas could also be compressed for longer distance transport to gas processing facilities. The production liquid, containing some remaining dissolved gas, is then sent to coalescing elbow 40 which allows the liquid to be redirected in a desired direction. Again, the fluid mixture flowing therethrough is subject to centrifugal forces which are beneficial in creating or maintaining droplet coalescence. In this exemplary embodiment, the liquid production fluid then passes through coalescing conduit 42. This apparatus is also designed to induce a swirling motion to create centrifugal forces to keep the fluid components of differing densities at least partially separated and to encourage coalescence of dispersed droplets.

This liquid flow is then passed to a coalescing control valve 44 to control the rate of fluid flow. Coalescing control valve 44 also imparts significant centrifugal forces to the liquid flowing therethrough. The liquid fluid is then delivered to liquid separator 46 for further separation of water and oil from the liquid water and oil fluid mixture. In this preferred exemplary embodiment, liquid separator 46 is a conventional three-phase separator. Another alternative type of separator which may be used includes liquid/liquid hydrocyclones. Those skilled in the art will appreciate that other alternative separators may be used which also benefit from the presence of enhanced coalesced droplets and/or stratified layers of fluid components which result from the use of one or more of the upstream flow conditioning apparatus.

Oil separated in liquid separator 46 is transported to oil storage tank 52. Gas which is separated is carried away by another gas pipeline 50. The separated oil, alternatively, may be shipped by way of pipeline, railway car, or semi-tanker to other oil processing facilities or refineries for further processing into desired end products. These products may include gasoline, diesel fuel, kerosene, lubricants, etc. The separated water passes through valve 54 and into wellbore 56 for elimination into disposal formation 60. Or else, the separated water may be piped or hauled away from separation system 20.

Figure 1B:
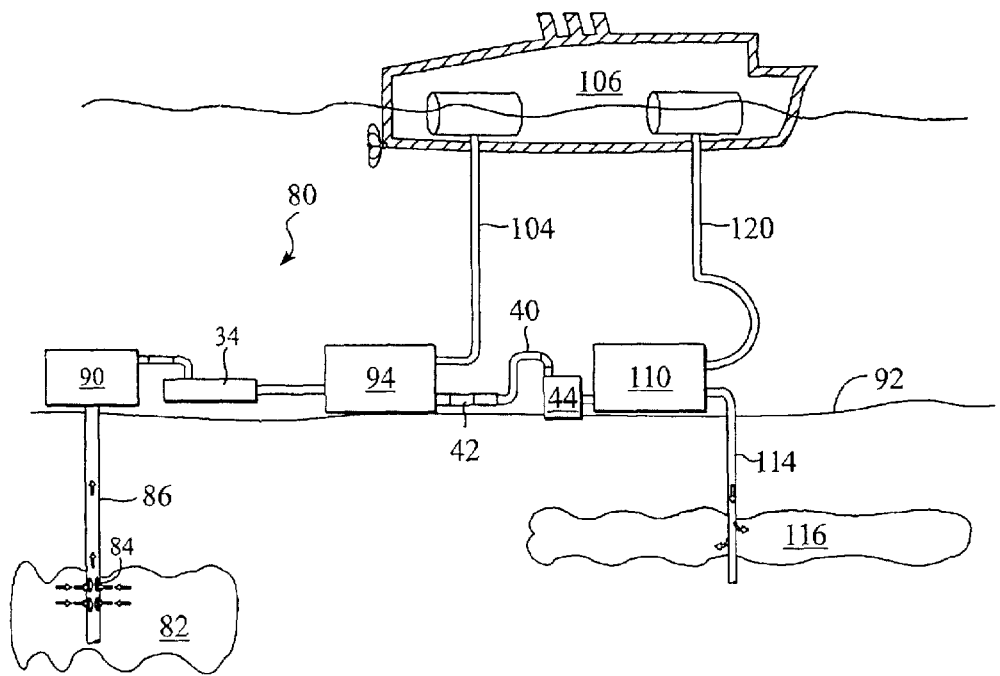
FIG. 1B is a schematic drawing of a seafloor mounted separation system employing flow conditioning apparatus which delivers separated gas and oil to a floating production, storage, and off-loading (FPSO) vessel.

Looking now to FIG. 1B, a seafloor separation system 80 is depicted. Again, an oil producing formation 82 passes production fluids through perforations 84 to reach a wellbore 86 which communicates with a wellhead 90 mounted on a seafloor 92. The production fluid is transported from wellhead 90 to a gas separator 94, ideally by way of flow conditioning apparatus or coalescing choke 34, which steps down fluid pressure. The gas removed by gas separator 94 may be sent by way of a gas pipeline 104 directly to a tanker ship 106, as shown, or else may be piped along the seafloor (not shown) to an onshore processing facility. Gas separator 94 is preferably of the gas/liquid cylindrical cyclone (GLCC) type of separator. Another type of suitable gas separator, offered by way of example and not limitation, may include a gravity-based horizontal or vertical separator.

The production fluid, now with gas substantially removed, is sent to a liquid separator 110 for separation of oil and water. A coalescing conduit 42, a coalescing elbow 40 and/or a coalescing control valve 44 may again be used as necessary to control the flow of the fluid mixture while inhibiting the shearing and diffusion of droplets in the liquid production fluid. As shown, a coalescing control valve 44 may be interposed between gas separator 94 and liquid separator 110 in order to provide a desired flow rate. Liquid separator 110 preferably is a liquid—liquid hydrocyclone type. Alternatively, other types of liquid separators could also be used such as a gravity based horizontal separator. Once again, separated water from liquid separator 110 may be disposed of down a wellbore 114 and into a disposal zone 116. Alternatively, the separated water could be disposed of directly into the body of seawater in accordance to local regulations. Separated oil is transported up a riser 120 to be stored within floating production, storage and off-loading (FPSO) vessel 106. Or alternatively, the separated oil could be temporarily stored in sea floor mounted storage tank (not shown) or sent directly by pipeline (not shown) to a local platform facility for further processing. Again, the choice and arrangement of flow conditioning apparatus used are made as needed to accomplish the particular separation or other processing operation at hand. Because all the equipment of separation system 80 must be transported to and mounted on the seafloor, it is highly desirable for the equipment to be very efficient, compact and light in weight.

Figure 1C:
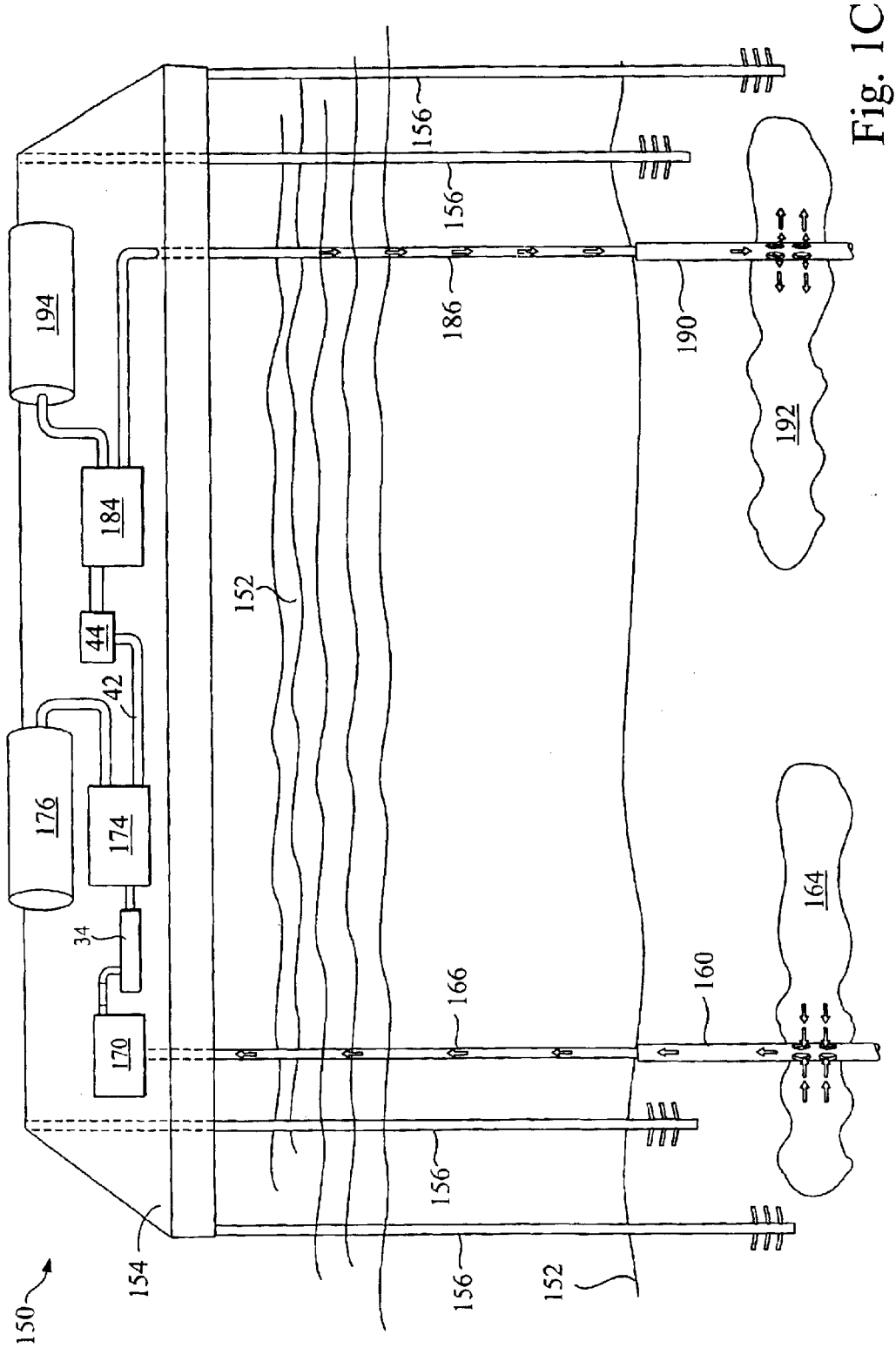
FIG. 1C is a schematic drawing of a separation system mounted on an offshore structure which employs flow conditioning apparatus to assist in the separation of gas and oil from water.

A third embodiment of a separation system 150, which uses flow conditioning apparatus made in accordance with the present invention, is shown in FIG. 1C. The separation system 150 is located above the sea surface 152 on an offshore platform 154, which in this exemplary embodiment, is supported by legs 156. Other types of offshore platforms may also be used, e.g., fixed or tethered platforms. A wellbore 160 extends from sea floor 162 down to an oil producing formation 164. A fluid producing tubing string, pipeline and riser 166 brings produced fluid from oil producing formation 164 to a wellhead 170 which could be located on the sea floor 162 or on the offshore platform 154.

Production fluid is transported from wellhead 170 through a coalescing choke 34 and then to a gas separation unit 174. Gas is separated from liquid in gas separation unit 174 with the separated gas being collected in gas storage tank 176. The production fluid, minus the removed gas, then flows through additional flow conditioning apparatus, such as coalescing conduit 42 and coalescing fluid control valve 44 until reaching oil and water liquid separator 184. Separated water is then disposed down a tubing string 186 to a wellbore 190 and into disposal formation 192. Separated oil is stored in oil storage tank 194. Alternatively, the oil may be transported (not shown) by pipeline to another platform or land based system by pipeline or by tanker ship. Separation system 150 again enjoys the benefit of using efficient, compact and lightweight separator equipment.

Figure 2A:
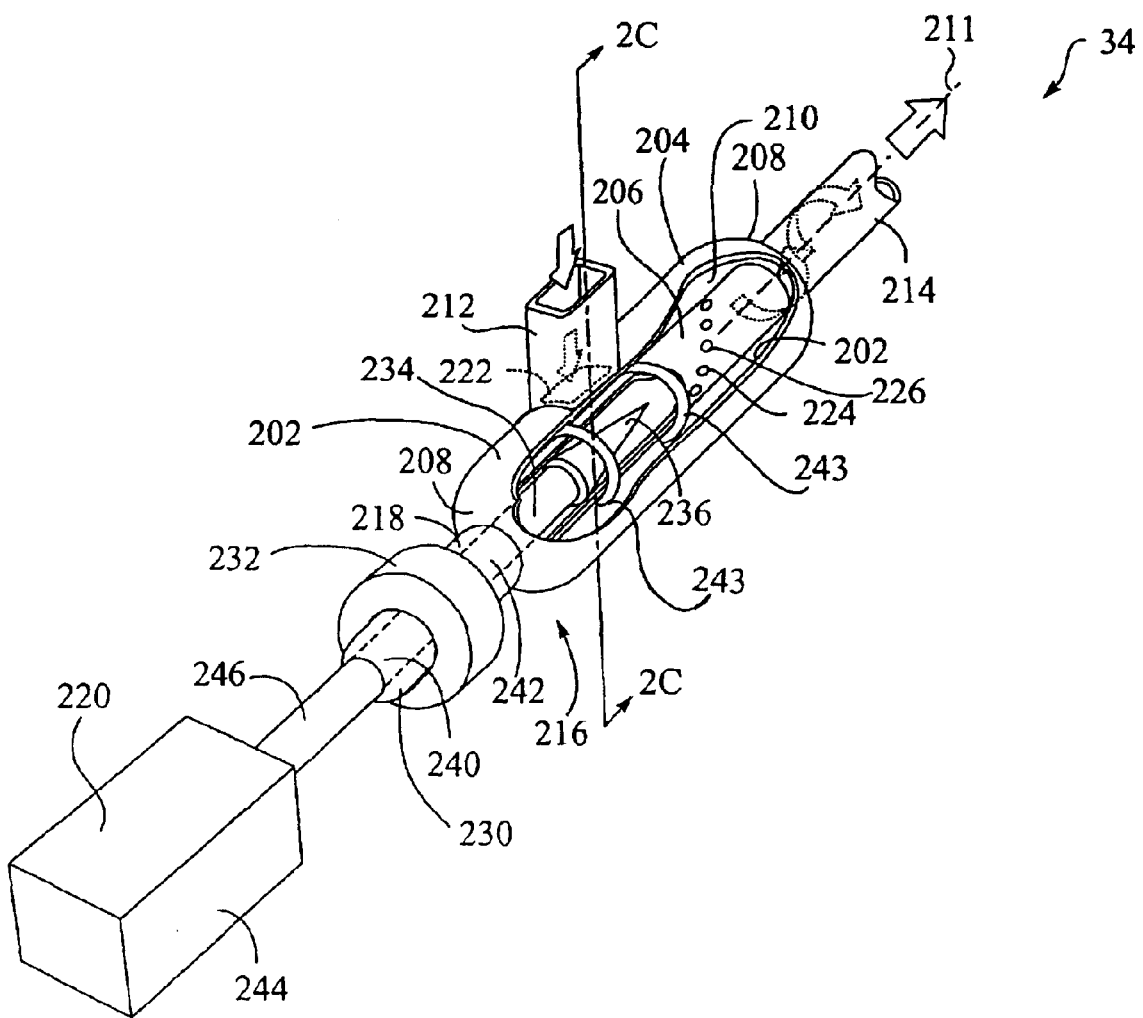

FIGS. 2A–C illustrate coalescing choke 34 which is used in separation systems 20, 80 and 150. A fluid mixture flowing through coalescing choke 34 is induced to swirl helically, as suggested by the arrows in FIGS. 2A and 2B, with fluid components of differing densities being subjected to centrifugal forces. Consequently, there is a tendency of fluid components to segregate and droplets of liquid to coalesce as a fluid mixture passes through coalescing choke 34.

Coalescing choke 34 includes a main valve body 202 comprising an outer cylinder 204, an inner cylinder 206 and a pair of annular and generally hemispherical end caps 208, all of which cooperate to form an annular swirl chamber 210. Swirl chamber 210 extends along a curvilinear swirl axis 211, which, in this embodiment, is straight. An inlet conduit 212, generally rectangular in cross-section, and a cylindrical outlet conduit 214 are attached to valve body 202 and are in fluid communication with swirl chamber 210. In exemplary example, inner cylinder 206 and outlet conduit 214 are made from a single integral piece of pipe. A plunger assembly 216 is mounted by a plunger mounting assembly 218 to valve body 202. A motor assembly 220 is connected to and controls the movement of plunger assembly 216 relative to swirl chamber 210 to control the flow of fluid through coalescing choke 34.

An inlet opening 222, in the shape of a rectangular arcuate segment, is formed in outer cylinder 204 to receive a corresponding arcuate inlet end of inlet conduit 212. The center of inlet opening 222 is offset from swirl axis 211 by a distance "e" as best seen in FIG. 2C. The eccentricity of inlet conduit 212 and inlet opening 222, relative to swirl axis 211, directs fluid entering into annular swirl chamber 210 to flow tangentially to the surface enclosed by the inner wall of swirl chamber 210 and to flow in a helical spiral about swirl axis 211, as suggested by the arrow in FIG. 2B.

Valve body 202 includes an outlet 224. In this embodiment, outlet 224 is formed by a plurality of orifices 226. Orifices 226 are arranged in a spiral manner relative to swirl axis 211. These orifices 226 are formed by drilling tangentially to the inner surface of inner cylinder 206 (FIG. 2E) and at angle θ (FIG. 2D) relative to a plane perpendicular to swirl axis 211. Angle θ may range from 0–90°, more preferably from 0–30°, and most preferably at 5–15°. Ideally, fluid passing through orifices 226 will be angled downstream such that the incoming liquid follows closely the streamlines of the internal flow. Orifices 226 are generally circumferentially extending relative to the inner wall, as compared to radially directed toward the swirl axis 211, and their peripheries are elliptical or are oblong and curved in shape. This enlarged periphery is helpful in producing larger droplets exiting from orifices 226 as compared to circular orifices which would open and extend radially toward swirl axis 211 and are oriented at angle θ=0°. (See FIGS. 3D and 3E.)

Alternatively, rather than using a plurality of spirally disposed orifices 226 to create outlet opening 224 in inner cylinder 206, a spiral slot or series of such slots (not shown) could also be formed in inner cylinder 206 to induce fluid flow to helically spiral along the inner circumference of inner cylinder 206. Other potential shapes or configurations of outlet opening 224 may include, but are not limited to, other various arrangements of spirally directing slotted orifices. Each of these shapes should be beneficial in maintaining the swirling flow of fluid passing through coalescing choke 34.

Plunger mounting assembly 218 includes an elongate cylindrical bearing block 230 and an end bearing block 232. Cylindrical bearing block 230 secures to one of the end caps 208, as shown in FIG. 2A. End bearing block 232 sealingly supports plunger assembly 216.

Plunger assembly 216 includes a cylindrical main body 234, a conical head 236 and a guide rod 240. Guide rod 240 slides and seals within end bearing block 232. The center of guide rod 240 includes a threaded bore 242 which cooperates with the motor assembly 220 to move plunger assembly 216 relative to main valve body 202. A pair of elastomeric O-rings seals 243 are disposed between inner cylinder 206 and main body 234 of plunger assembly 216 to prevent fluid from leaking between valve body 202 and plunger assembly 216. The conical shape of conical head 236 assists in maintaining a relatively constant tangential velocity along swirl axis 211 in inner cylinder 206 by providing a restricted space for the slower upstream flow. The space available for fluid rotation increases downstream to accommodate the increased cumulative flow from orifices 226. Plunger assembly 216 may be reciprocated such that plunger main body 234 covers and uncovers selected orifices 226 forming outlet 224 to control fluid flow and thus control the amount of pressure drop across coalescing choke 34. Motor assembly 220 includes a step motor 246 which rotates a drive shaft 246. Drive shaft 246 is threaded and cooperates to threadedly engage and drive plunger shaft 240 to reciprocate plunger assembly 216.

In this exemplary coalescing choke 34, there are 13 orifices 226 formed using a ¼-inch or 0.64 cm drill bit to drill holes tangentially opening relative to the inner surface of inner cylinder 206. FIGS. 2D and 2E illustrate the formation of an orifice 226. Swirl chamber 210 is formed by inner cylinder 206 which is 2 inches or 5.08 cm in diameter while outer cylinder 204 is 3 inches or 7.62 cm in diameter. Conical head 236 is approximately 5 inches or 12.70 cm in length. Of course, components of other dimensions could be utilized to construct a coalescing choke which is also in accordance with the spirit of this invention.

Note that inlet 222 and outlet 224 are arranged in series to provide an incremental stepwise pressure drop. Further, orifices 226 forming outlet 224 cooperate to allow fluid to pass therethrough in a parallel fashion. This gradual, as opposed to abrupt, letdown in pressure through serially and parallel arranged openings and orifices is believed to be less disruptive to droplet formation than utilizing a single larger orifice as is used in convention chokes for pressure reduction.

In operation, a production fluid is received by inlet conduit 212. Ideally, the fluid contains large droplets of coalesced oil and/or water, along with potentially some gas. This fluid flow is directed by inlet conduit 212 through inlet opening 222 and into swirl chamber 210 in a direction generally tangential to swirl axis 211 (FIG. 2E). The fluid then swirls helically through annular swirl chamber 210 until reaching orifices 226 of outlet 224. The fluid mixture passes through orifices 226 to reach outlet conduit 214 while maintaining the swirling motion, as indicated in FIG. 2A. This swirling motion will generally continue in outlet conduit 214 until travelling downstream several diameters relative to the size of outlet conduit 214. The dissipation distance will depend on factors such as the longitudinal velocity of the flowing fluid mixture in outlet conduit 214, the mixture viscosity, and the presence of gas.

Due to the swirling motion of the fluid passing through coalescing choke 34, the fluid flowing therethrough is subjected to centrifugal forces throughout the travel through swirl chamber 210 and along at least a portion of outlet conduit 214. The centrifugal forces induce the heavier components, such as water, to separate from lighter components, such as oil. The oil phase or coalesced oil droplets tend to concentrate and remain together during the travel through coalescing choke 34. Similarly, the water phase and water droplets tend to remain together. Consequently, fluid leaving coalescing choke 34 will suffer a minimum of breakup and dispersion to the coalesced droplets passing therethrough and, in fact, may enhance coalescence due to the centrifugal forces exerted upon the passing fluid.

The production fluids pass through swirl chamber 210 of coalescing choke 34 via inlet 222 and outlet orifices 226. This flow path minimizes the relative velocity between the incoming fluids and the decelerated downstream fluids due to the spiraling motion. The droplets formed are larger utilizing the tangentially directing inlet 222 and outlet 224 because the size of surviving droplets is inversely proportional to the relative velocity between droplets flowing through choke 34. The tangentially directing inlet 222 and outlet orifices 226 also induce a swirling motion which creates centrifugal forces, thereby enhancing the coalescence or maintenance of oil and water droplets while accomplishing the desired pressure drop.

Figure 3A:
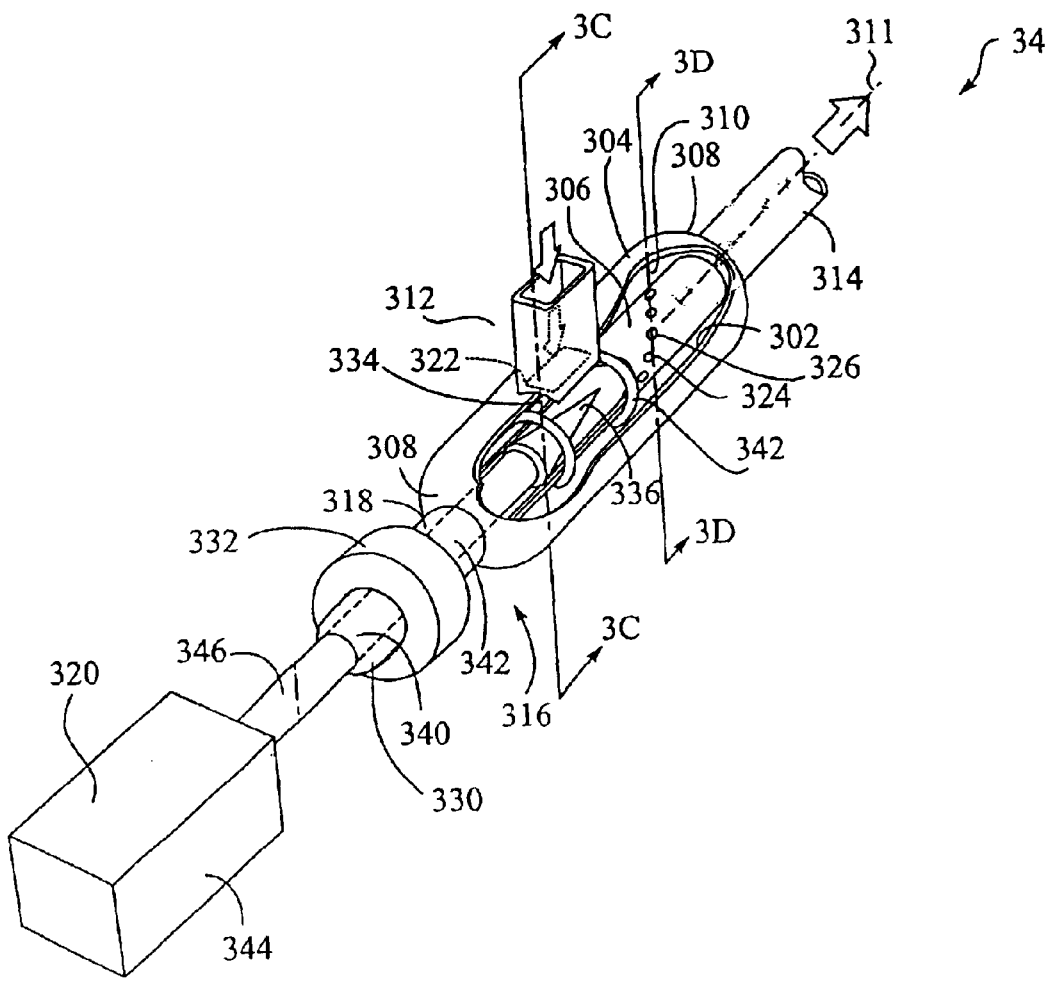
Figure 5A:
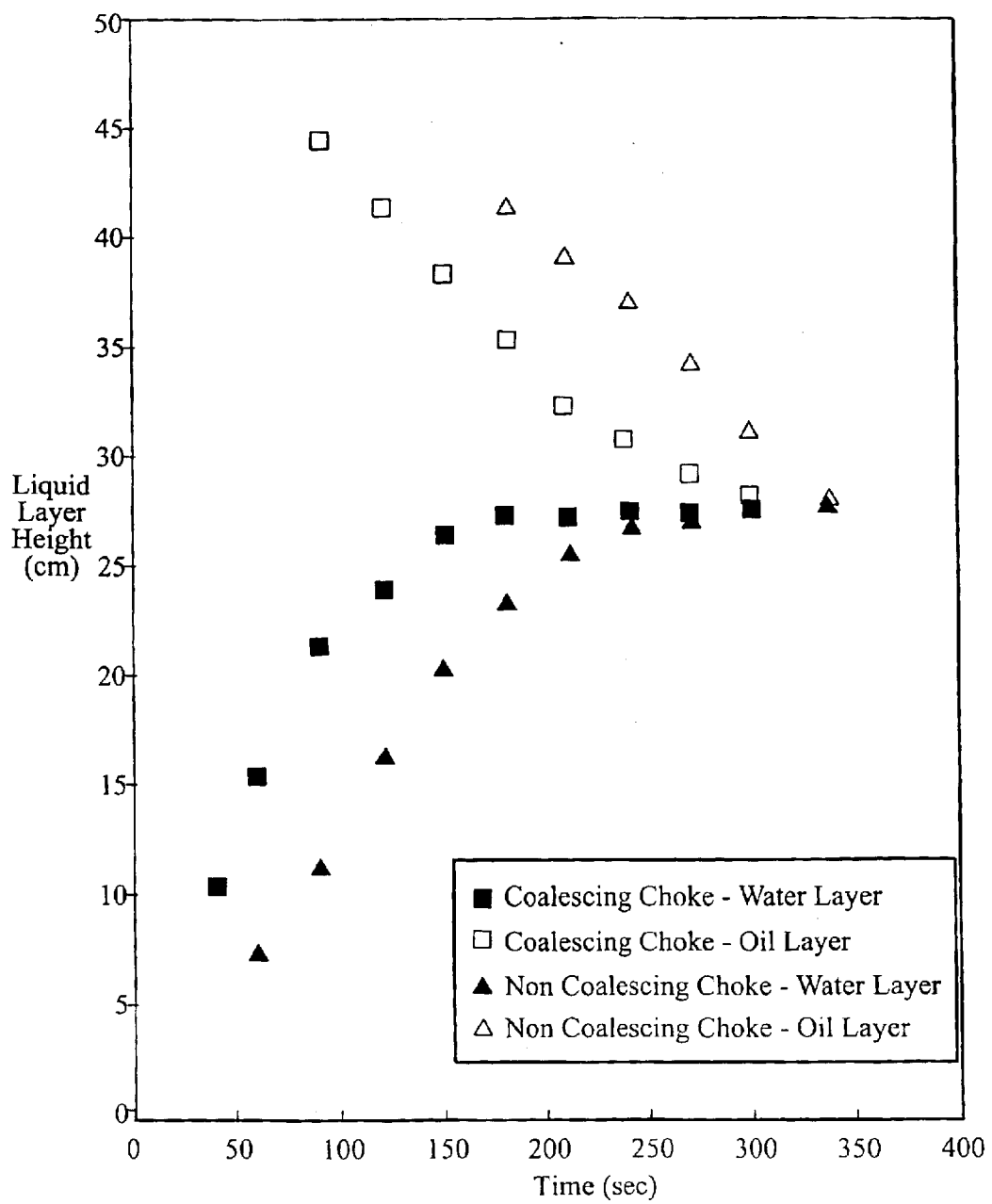
FIG. 5A is a graph illustrating the results of a comparison test run in the test setup of FIG. 4 utilizing the coalescing choke of FIG. 2 and the non-coalescing choke of FIG. 3.
Figure 5B:
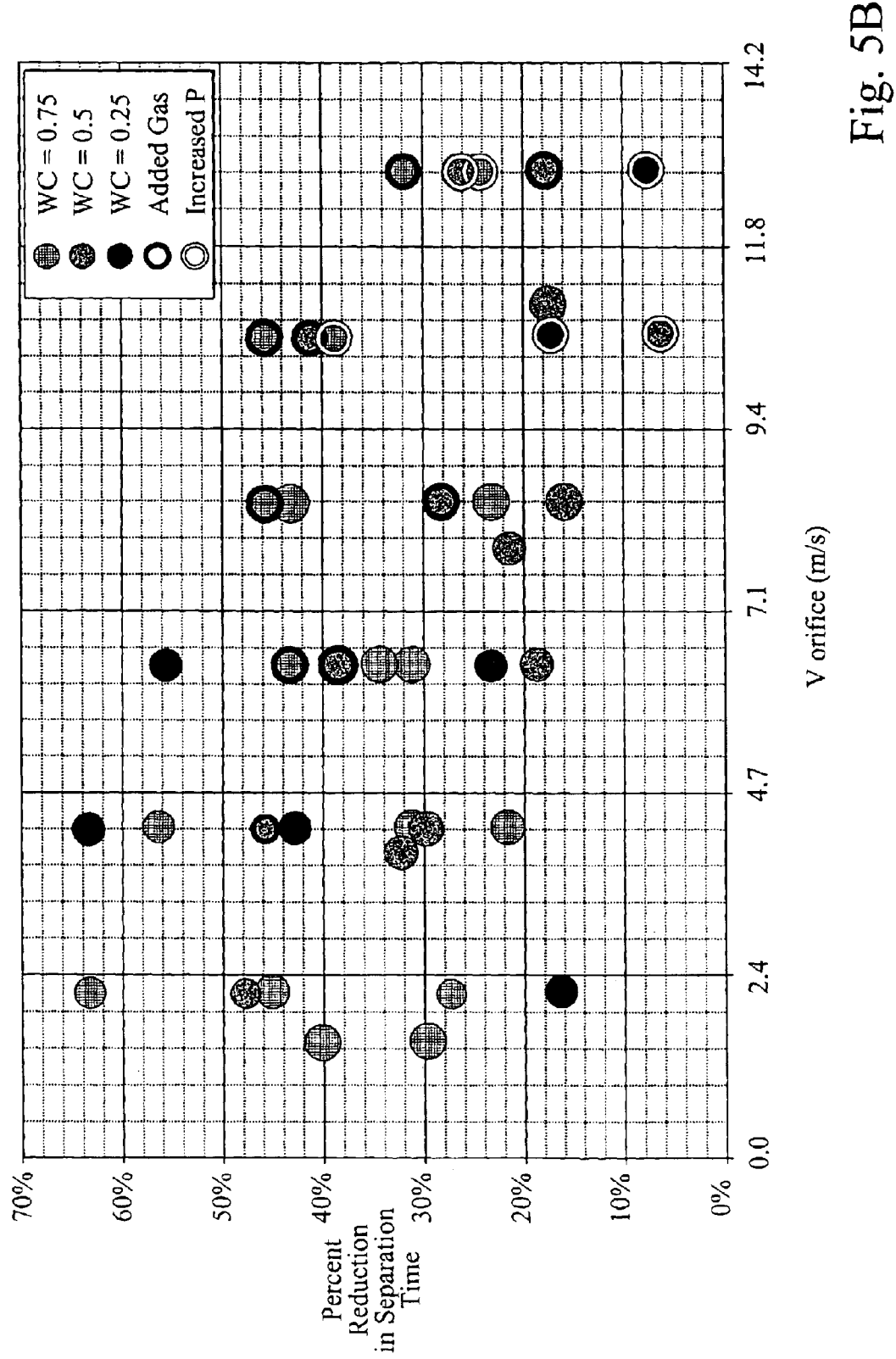
FIG. 5B is a graph of results for a number of coalescing tests conducted with varying water cuts, added gas content, and increased pressure.

FIGS. 3A and 3B illustrate a comparable prototype of a non-coalescing choke 300 which has been used as a base reference apparatus in tests for coalescence against coalescing choke 34. The results of these tests are shown in FIGS. 5A and 5B and will be discussed below. Non-coalescing choke 300 has the same general cross-sectional area open to flow as does coalescing choke 34. A primary difference between chokes 34, 300 is that the inlet and outlet orifices of the coalescing choke 34 are oriented to direct fluid to flow tangentially with respect to the inner pipe wall to produce a swirling or helical motion and to reduce the relative velocity differences between incoming and exiting fluid components as compared to choke 300. Non-coalescing choke 300 has an inlet and outlet that directs fluid radially toward a central axis 311 rather than circumferentially there about.

Non-coalescing choke 300 includes a main valve body 302 including an outer cylinder 304, an inner cylinder 306, and a pair of end caps 308 which form an annular chamber 310. Annular chamber 310 extends about central axis 311. A rectangular inlet conduit 312 and a cylindrical outlet conduit 314 are in fluid communication with annular chamber 310. A plunger assembly 316, similar to plunger assembly 216, is used to control the flow of fluid through non-coalescing choke 300. A plunger mounting assembly 318 mounts plunger assembly 316 to main valve body 302. A motor assembly 320 is be used to control the movement of plunger assembly 316 relative to annular chamber 312.

An inlet opening 322 is formed in outer cylinder 304 and is symmetric about central axis 311. Inlet opening 322 is arcuate and rectangular in shape and is of the same size as opening 222 of coalescing choke 34. A fluid mixture entering annular chamber 310 from inlet conduit 312 through inlet opening 322 will therefore not create a strong swirling motion in chamber 310, but rather will flow symmetrically about either side of axis 311, as suggested in FIG. 3C, as the fluid mixture moves downstream. An outlet opening 324, consisting of a plurality of orifices 326, is formed through inner cylinder 306 to provide fluid communication with outlet conduit 314. In this instance, orifices 326 are bored radially through inner cylinder 306 rather than tangentially directed relative to the inner surface of inner cylinder 306. FIGS. 3D and 3E illustrate a drill bit boring through inner cylinder 306 radially toward central axis 311. In this particular test choke 300, the orifices 326 are again formed using a ¼" drill bit. The relative positioning of orifices 326 are generally in the same location as compared with orifices 226 of coalescing choke 34.

Plunger bearing assembly 316 has an elongate annular bearing block 330 and an end bearing block 332. Plunger assembly 316 comprises main body 334, conical head 336 and guide rod 340. Motor assembly 320 includes a step motor 344 and a threaded drive shaft 346, which cooperatively drives guide rod 340 to reciprocate plunger assembly 316.

The fluid flow path through non-coalescing choke 300 is generally same as with coalescing choke 34. However, inlet opening 322 and outlet orifices 326 fail to induce a swirling motion in a fluid mixture passing through annular chamber 310. Fluid enters inlet conduit 312, passes through inlet opening 322, and into annular chamber 310. The fluid exits annular chamber 310 through cylindrical orifices 326 and radially enters outlet conduit 314. The fluid mixture then departs non-coalescing choke 300 through outlet conduit 314.

Fluid flowing through circumferentially opening or directing orifices 226 will direct fluid tangentially with respect to the curved surface enclosed by the inner surface of cylinder 206, as shown in FIG. 2E. By directing the incoming fluid to pass circumferentially along the inner circumference and swirl, rather than striking a surface bluntly, the rate of change of angle or direction of the fluid flow is minimized as is the rate of change of velocity between droplets of fluid. Further, a swirling action is induced as compared to a rather turbulent interaction created as seen in FIG. 3C.

Figure 4A:
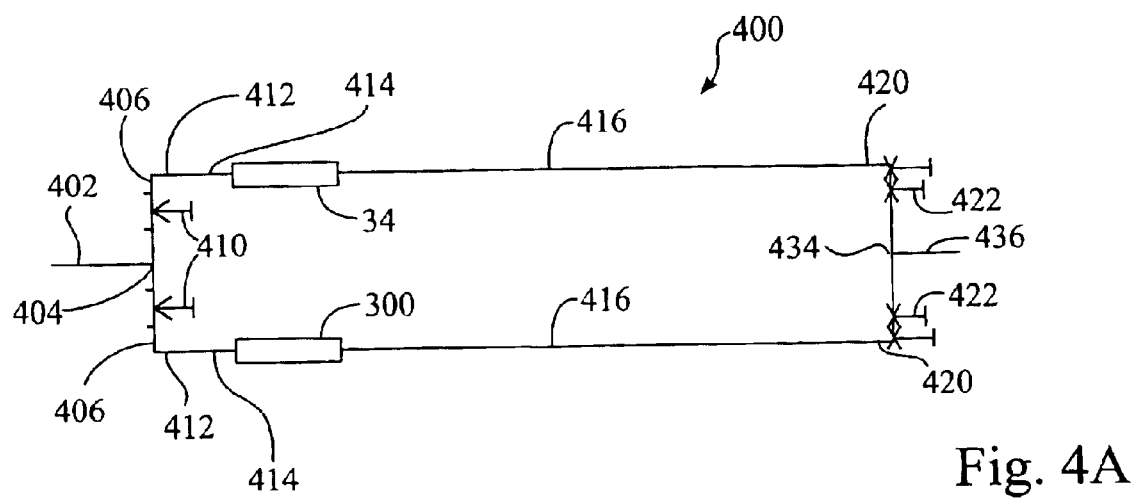
FIGS. 4A–C are top and side schematic drawings of a test setup for testing coalescence performance between fluids directed through the coalescing and the non-coalescing chokes of FIGS. 2 and 3, and an enlarged fragmentary view of a trap section.
Figure 4B:
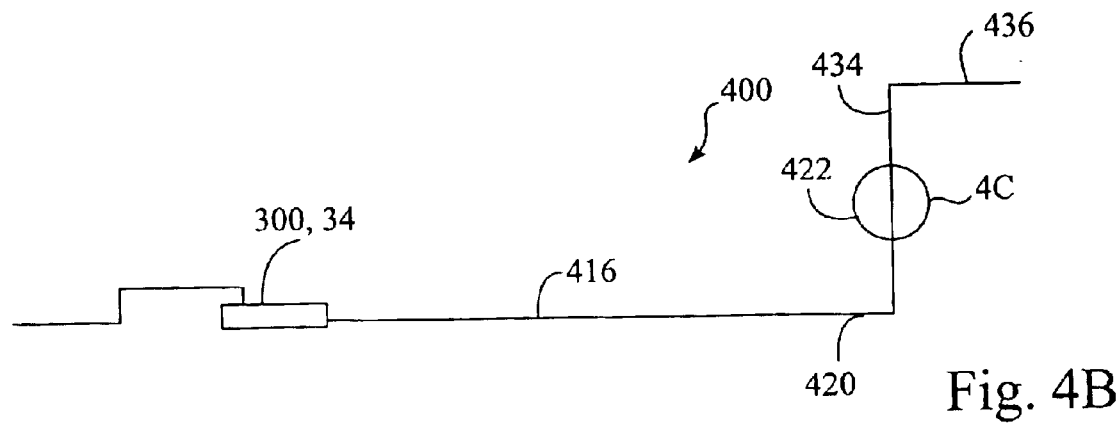
Figure 4C:
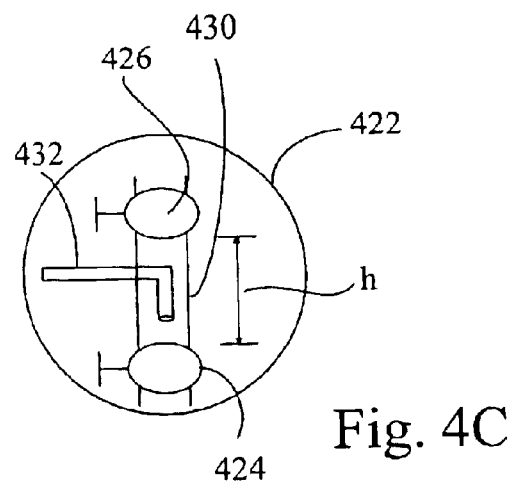

FIGS. 4A–C depict top, side and an enlarged fragmented portion of a test apparatus 400 which is used to compare the coalescing properties of fluid passing through coalescing choke 34 and non-coalescing choke 300. Test apparatus 400 includes an upstream delivery line 402, a T-joint 404, a pair of first conduits 406 each having control valves 410 interposed therein, a pair of elbows 412, a second set of conduits 414 which are respectively connected to coalescing choke 34 and non-coalescing choke 300. Downstream from coalescing and non-coalescing chokes 34 and 300 are conduits 416 representing normal transport pipe. Each of these conduits 416 is approximately 6.1 meters in length.

At the end of conduits 416 are elbows 420 which lead to vertically extending trap sections 422 which are shown in an enlarged view in FIG. 4C. Trap sections 422 each include a pair of valves 424, 426 that surround an intermediate viewing conduit 430. Viewing conduit 430 is approximately 50 cm in height. Viewing conduit 430 is ideally transparent, circular in cross-section, and has graduation lines to allow measurement of the relative height of separated fluid interfaces in the cross-section. A pitot tube 432 is attached to each of viewing conduits 430, which allows for fluid samples to be withdrawn if so desired. The fluid sample can then be allowed to separate under gravity with the time to achieve desired levels of separation recorded. Downstream from trap sections 422 is a T-joint 434 leading to an exit line 436. The size of each of the aforementioned viewing conduits 430 is 5.08 cm in diameter.

A test for coalescence of droplets downstream from coalescence choke 34 and non-coalescence choke 300 was conducted in test apparatus 400 as follows. Production fluid was introduced into upstream delivery line 402. The production fluid was comprised of the following constituents: a refined mineral oil, tap water and air. Other input parameters for the test include: oil specific gravity=0.85, oil/water interfacial tension ~25 dynes.cm, oil viscosity ~3 cp. The production fluid was allowed to alternately pass through coalescence choke 34 and non-coalescing choke 300. After a period of time, valves 424, 426 in trap section 422 were closed to trap fluid in respective viewing conduits 430. The water and oil mixtures in viewing conduits 430 were allowed to settle over time. The relative depths of coalesced oil (clear oil layer) floating atop a mixture of oil and water which resides upon a denser layer of coalesced water (clear water layer) were recorded over time.

FIG. 5A illustrates the results of this test. A clear water layer settled out from the oil and water mixture much more quickly after passing through coalescing choke 34 than when passing through non-coalescing choke 300. Similarly, the clear oil layer from the mixture passing through coalescing choke 34 coalesced and separated out of the oil and water mixture much more quickly than did the clear oil layer which had gone through non-coalescing choke 300. Also, it was observed that the droplets passing downstream from coalescing choke 34 were significantly larger than droplets passing downstream from non-coalescing choke 300.

FIG. 5B depicts the results from numerous comparative tests between the coalescing and non-coalescing chokes 34, 300 under a variety of conditions. These data show the percent reduction in time to separate 95% of the water from oil for coalescing choke 34 relative to non-coalescing choke 300 plotted against the average velocity of the fluid passing through an orifice 226 of coalescing choke 34 or orifice 326 of non-coalescing choke 300. FIG. 5B shows that coalescing choke 34 outperformed non-coalescing choke 300 for all conditions studied. The average improvement in reducing the separation time was about 30%. However, the improved performance of coalescing choke 34 began to diminish with increased velocity. FIG. 5B shows that the performance enhancement of the coalescing choke over the non-coalescing choke is significant even at low velocities, reaches a maximum at intermediate velocities, and diminishes at higher fluid velocities through the orifices. This suggests that large pressure drops may require a series combination of coalescing chokes 34 to achieve better performance.

While not wishing to be tied to a particular theory, it is believed fluid passing through coalescing choke 34 is not sheared or dispersed as much as fluid passing through the more conventional non-coalescing choke 300 for several reasons. First, orifices 226 have larger elliptical or oval perimeters as compared to orifices 326 which have smaller circular perimeters. The larger contacting perimeter is believed to encourage the formation of larger drops. Second, the relative velocity differential between droplets of fluid exiting from swirl chamber 210 through circumferentially directing orifices 226 into outlet conduit 214 is much less than for droplets of fluid passing from annular chamber 320 through radially opening orifices 326 and into outlet conduit 314 because fluid is directed to flow smoothly circumferentially along the inner periphery of outlet conduit 214 as compared to the fluid being directed radially toward the central axis of outlet conduit 314, again resulting in less severe droplet breakup. Finally, centrifugal forces induced upon fluids due to the swirling or helical motion of fluid passing through choke 34 tends to segregate the fluids according to density much more than in the case where such fluid motion is absent.

FIGS. 6A–C illustrate another flow conditioning apparatus, coalescing control valve 44. Coalescing control valve 44 may be used to control the flow rate or pressure loss of a fluid passing therethrough. Coalescing control valve 44 includes a main valve body 502, a cylindrical inlet conduit 504 which leads to a rectangular inlet channel 506, and an elongate circular outlet conduit 510. Outlet conduit 510 has an inlet slot 512 formed therein to receive fluid from rectangular inlet channel 506. Inlet slot 512 is located such that an adjacent wall 513 in rectangular inlet channel 506 is generally tangentially aligned with outlet conduit 510, as best seen in FIG. 6B.

A mounting collar 514 connects cylindrical inlet conduit 504 to rectangular inlet channel 506. Disposed within channel 506 is a valve diverter plate 516 which controls the size of the inlet opening in rectangular inlet channel 506 through which a fluid must pass to enter inlet slot 512. In the preferred embodiment, diverter plate 516 is mounted by way of a hinge 520 relative to channel 506. Diverter plate 516 moves such that a second end portion 522 of diverter plate 516 moves to control the access size to inlet slot 512 available for fluid to pass from rectangular inlet channel 506 and into outlet conduit 510. As shown, diverter plate 516 is mounted relative to a push rod 523, which is controlled by a stepper motor or solenoid 526. By controlling stepper motor or solenoid 526, the axially displacement of push rod 523 and coverage of valve diverter plate 516 over slot 512 is controlled. The flow rate through control valve 44 is controlled by moving the closure, diverter plate 516, relative to inlet slot 512.

As an alternative flow control mechanism, FIG. 6C shows a rotary vane 530 which is placed within outlet conduit 510. A motor (not shown) may be used to control the rotation of rotary vane 530 within outlet conduit 510. Consequently, the access opening, size, and relative flow rate through valve 44 is controlled.

In operation, a production fluid containing components of differing densities is directed into cylindrical inlet conduit 504. The production fluid proceeds to enter rectangular inlet channel 506 striking diverter plate 516 at an obtuse angle such that there is not a substantial direct impact which would significantly break up droplets. The production fluid next passes through inlet opening 512, the access to which is controlled by diverter plate 516 or rotary vane 530, and ultimately, by stepper motor or solenoid 526. As the production fluid tangentially enters cylindrical outlet conduit 510, the production fluid strikes the inner wall of outlet conduit 510 nearly tangentially causing the production fluid to begin to spiral as it moves axial downstream in outlet conduit 510. The spiral or swirling motion again causes centrifugal forces to be exerted on the production fluid thereby separating the different density fluid components and maintaining or enhancing the coalescence of droplets in the production fluid as it passes through coalescing control valve 44.

Figures 7A, 7B:
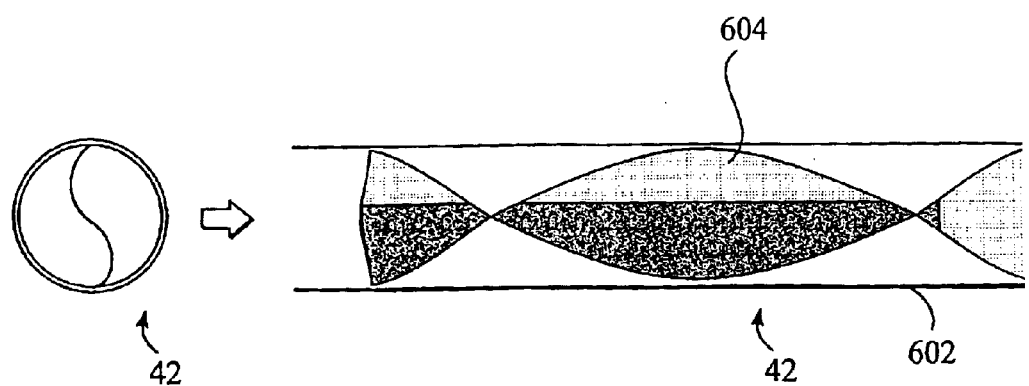
FIGS. 7A–C are schematic drawings showing an end view, a fragmentary view and a partial cutaway view of a coalescing or flow conditioning conduit which includes a twisted vane.
Figure 7C:
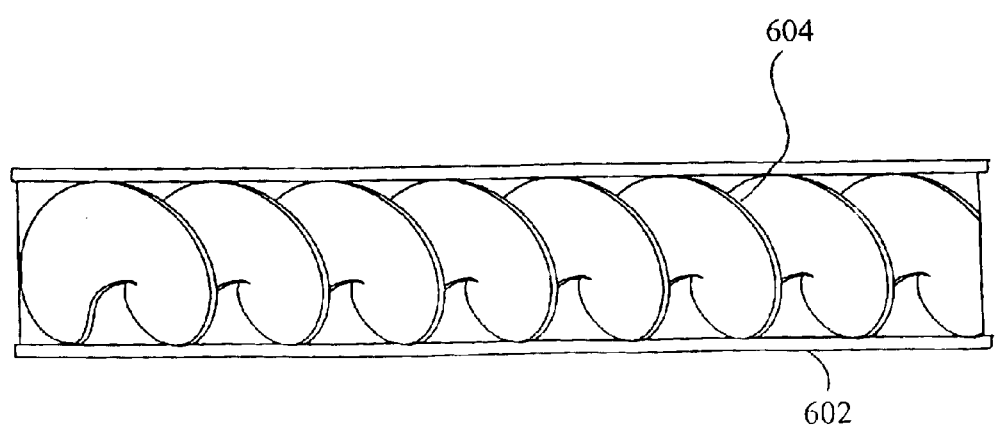

FIGS. 7A–B illustrate a coalescing conduit 42. Coalescing conduit 42 preferably includes an elongate cylinder 602 with a twisted or spiraling vane 604 disposed therein. Spiraling vane 604 is depicted in FIG. 7C. As a production fluid passes through coalescing conduit 42, the production fluid follows the path provided between the spiraling vane 604 and outer cylinder 602. Again, centrifugal forces are imparted upon the production fluid to maintain or enhance the coalescence of the droplets in the production fluid.

FIGS. 8A–B illustrate an alternative coalescing choke 620 which also has an adjustable choke feature. Coalescing choke 620 includes an elongate outlet cylinder 622, an inlet conduit 624 which is attached intermediate to cylinder 622, and a vane assembly 626. Vane assembly 626 comprises a twisted vane 630 which is mounted on a drive screw 632 driven by a motor 634. Drive screw 632 may be a hollow perforated tube with tangentially directing inlet orifices (not shown) to allow separated oil to flow axially inside drive screw 632, if so desired. A shut-off block 636 provides a sliding seal within outlet cylinder 622. Vane 630 is attached to and moves shut-off block 636. When drive screw 632 is rotated, mating threads (not shown) within shut-off block 636 cooperate with drive screw 632 to axially move shut-off block 636 and vane 630. As best seen in FIG. 8B, inlet conduit 624 includes a diverter plate 640 and outlet cylinder 622 has an inlet slot 642. Diverter plate 640 cooperates with inlet slot 642 to direct fluid to enter outlet cylinder 622 generally tangentially to the curved surface enclosed by inner wall of outlet cylinder 622.

In this configuration, much of the pressure drop is achieved by frictional resistance developed along twisted vane 630. Mounting twisted vane 630 and shut-off block 636 on drive screw 632 allows vane assembly 626 to produce more or less pressure drop while maintaining a swirling flow with relatively low pressure gradient. Rotating drive screw 632 moves twisted vane 630 axially along cylinder 622. The pressure drop across coalescing choke 620 is thus largely controlled by the length of twisted vane 630 that a fluid must pass by to exit cylinder 622.

FIGS. 9A–E shows a coalescing elbow 40 formed of two out-of-plane 90° elbows. Elbow 40 includes an inlet portion 702, an intermediate riser portion 704, and an outlet portion 706, which combine to form a generally S-shaped fluid directing element. Each of the 90° elbows is aligned in planes which are perpendicular to each other, as suggested in FIG. 9B. It is also possible to use a pair of joined 45° elbows (not shown) and the joined elbows do not necessarily have to lie in perpendicular planes. It is believed that such elbows can be aligned out of plane with one another from 45–90° and still induce a significant swirling of fluid.

Figure 9A:
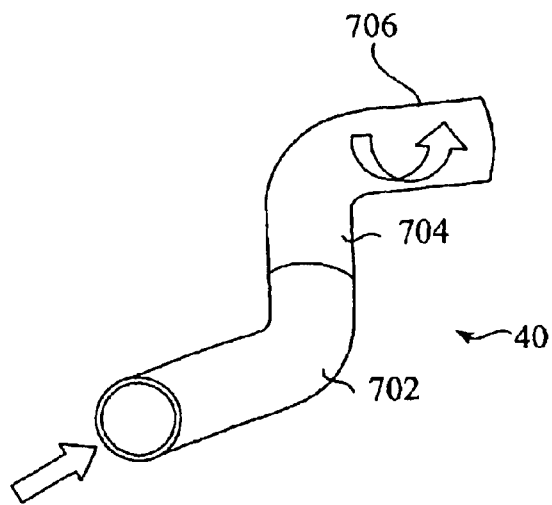
FIGS. 9A–D are schematic drawings of a coalescing or flow conditioning elbow which includes two out of plane elbows.
Figure 9B:
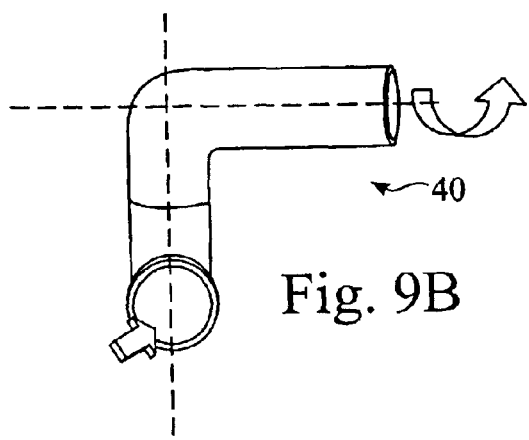
Figure 9C:
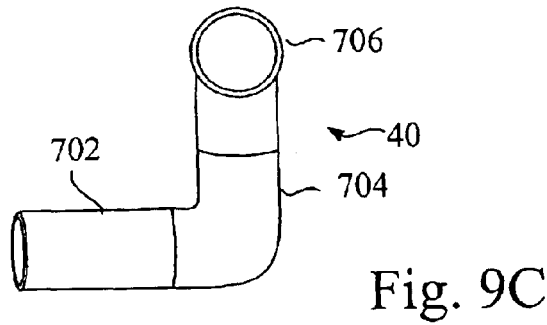
Figure 9D:
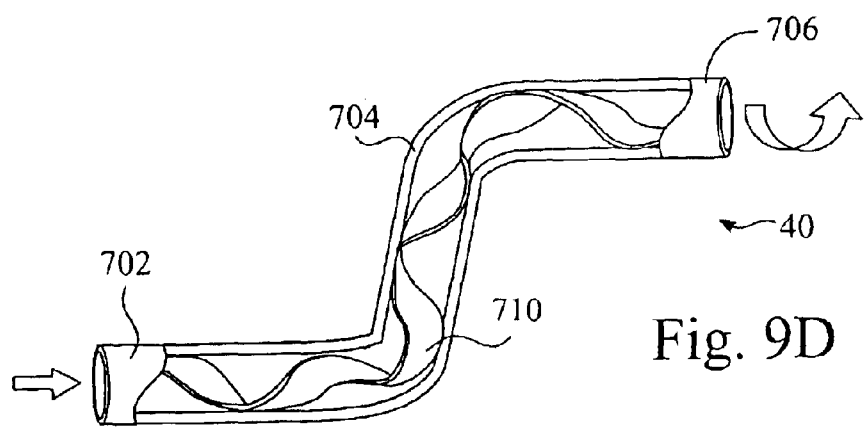

This S-shaped elbow 40 induces swirling as a production fluid passes through elbow 40. FIG. 9D illustrates that for additional swirling enhancement, elbow 40 may also include a spiraling vane 710, or other inserts, for further directing the fluid flow. Again, the swirling flow of fluid passing through coalescing elbow 40 enhances the coalescence of droplets.

Figure 10A:
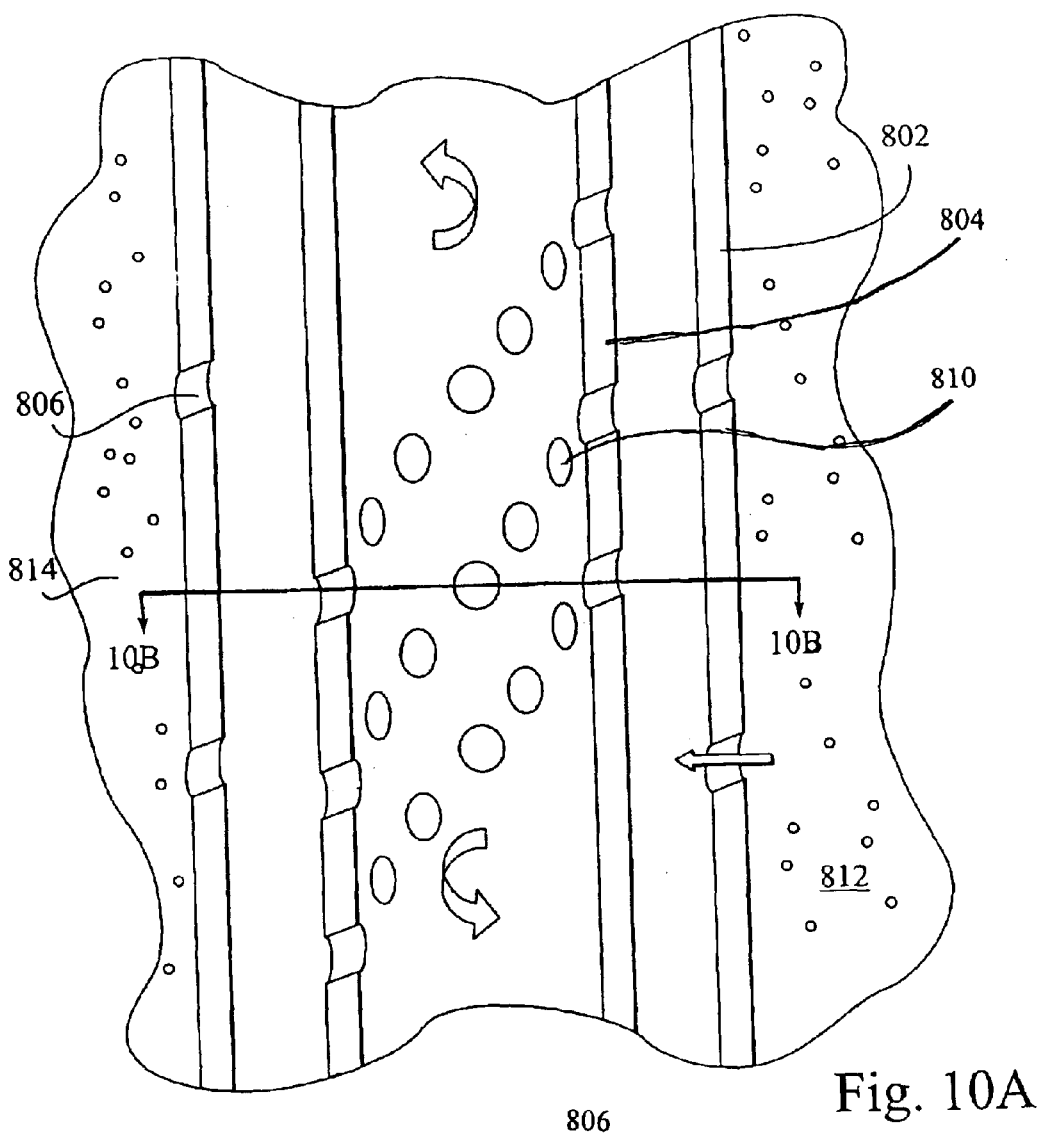
FIG. 10 is a schematic cutaway of a downhole completion system employing production tubing and casing having orifices which direct fluid to swirl helically along the inner peripheries of the casing and tubing.
Figure 10B:
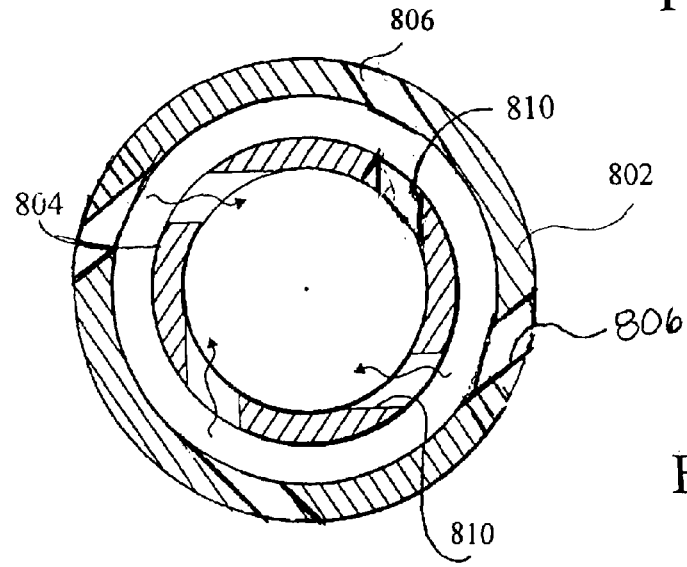

FIG. 10 shows a downhole completion system 800 in which the principles of the present invention are applied. This completion system could be an open hole completion, a completion utilizing a slotted liner or casing, or a completion employing a casing which is perforated downhole. In completion system 800 shown in FIG. 10, completion system 800 includes a slotted liner or casing 802 and located concentrically therein is a production tubing 804. Casing 802 includes orifices 806 and production tubing 804 has orifices 810. Production fluids are received from a surrounding formation 812. Orifices 806 and 810 are formed such that they direct fluid flowing therethrough to helically swirl along the inner periphery of liner 802 and along the inner periphery of production tubing 804. That is, they are bored in a manner described above and as shown with respect to FIGS. 2D and 2E. Such a configuration is beneficial in downhole separation of oil and water. With the oil-water mixture somewhat separated, emulsions are less likely to form. Without the emulsions, the fluid mixture can flow with less resistance through the production tubing and up to a wellhead.

Figure 11:
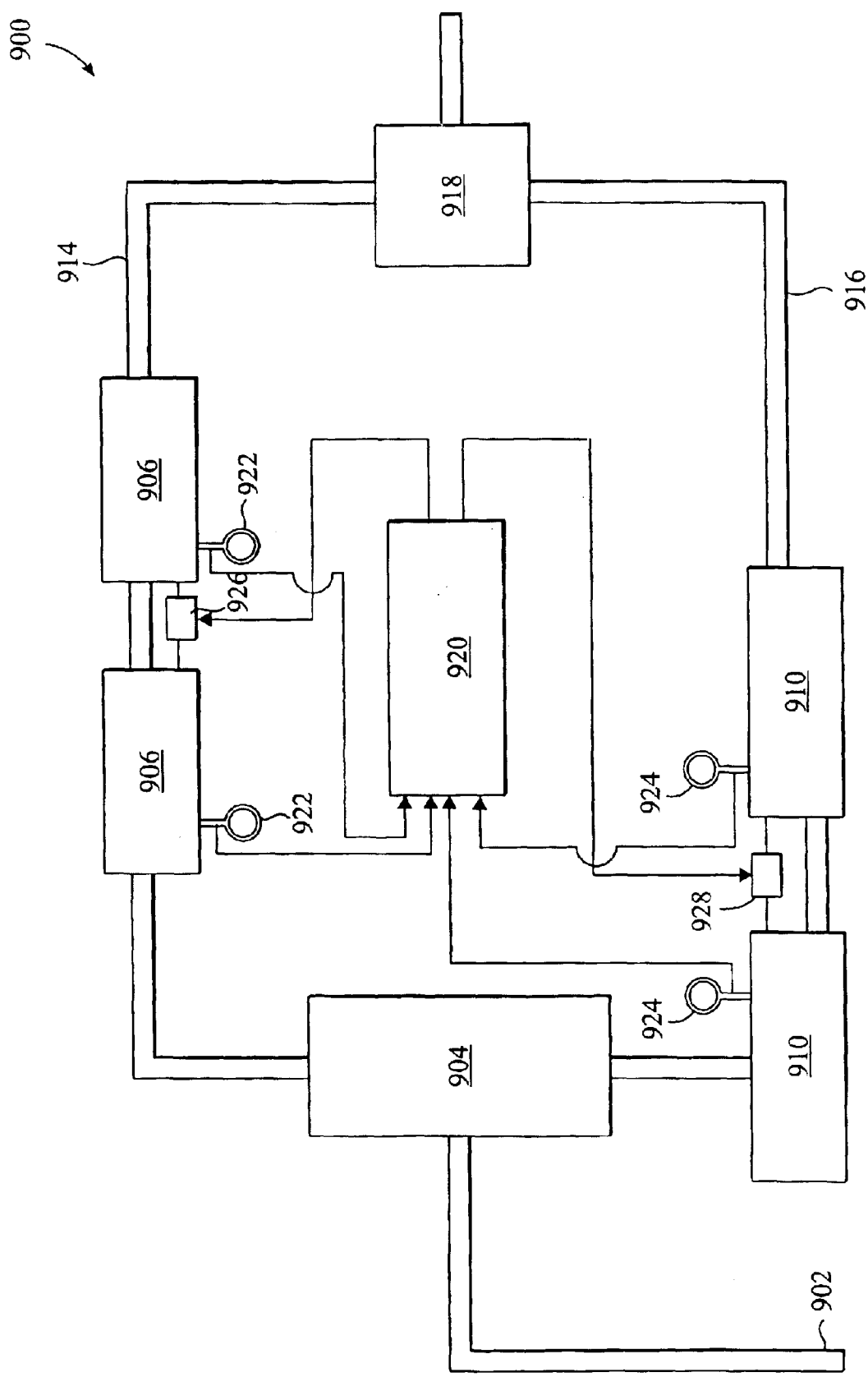
FIG. 11 is a block diagram of a combined choke and separation system.

If the surrounding formation 812 must be perforated, a casing may be used which is perforated using conventional downhole perforating techniques. If an open hole completion is utilized, only a piece of perforated tubing, including circumferentially directing orifices, will be used. Also, rather than using a number of spaced apart orifices, elongate slots which also direct fluid circumferentially, rather than radially, along the inner circumference of the casing or tubing to create a helical flow, may also be used and is within the scope of this invention. FIG. 11 illustrates a block diagram of a separation/choke system 900 for choking production while limiting dispersion, emulsion and foam production and enhanced liquid separation and droplet formation. The concept is to separate gas and liquid temporarily and then reduce pressure in the separated streams, by choking, before recombining the streams for pipeline transport.

System 900 includes an inlet conduit 902 which carries a multiphase fluid mixture, i.e., gas and liquid, which is input to a compact gas/liquid separator 904, for example, a GLCC separator. Most, but not all, of the gas in the incoming multiphase fluid mixture will be separated from the liquid phase by separator 904. Separated gas is directed to pairs of coalescing choke 906 while liquid is directed to a pair of chokes 910. Chokes 906 and 910 are of the type described above with respect to coalescing choke 34. While the bulk quantities of gas and liquid are choked separately through coalescing chokes 906 and 910 to reduce gas pressure, a small amount of gas is allowed to carry-under with the separated liquid to improve oil-water coalescence. This improvement due to the presence of small amounts of gas can be seen in FIG. 5B. This advantage is further described in U.S. patent application Ser. No. 09/073,510, now abandoned the teachings of which are hereby incorporated by reference. The spiraling gas in chokes 910 provides a central core about which the heavier oil and water spiral. Therefore, the oil is moved away from the swirl axis of choke 910 and is more susceptible to centrifugal forces. Also, there is an affinity between hydrocarbon gases and liquids which helps to separate the oil from the water.

As a substantial portion of the fluid mixture has been diverted, i.e., the gas has been routed to gas side chokes 906, the volume of fluid passing through coalescing chokes 910 will be reduced. Accordingly, the velocity of liquid flow through the liquid coalescing chokes 910 will also be reduced. As suggested by test results above in FIG. 5B, lowering the liquid velocity through orifices 226 will result in greater droplet coalescence and formation. Furthermore, it is believed that pressure loss through the coalescing gas chokes 906 will condense small amounts of liquids as well. The condensed liquid droplets on the gas side coalesce with other droplets to form a low speed film flow on walls of chokes 906.

Fluid exiting coalescing gas coalescing chokes 906 and liquid coalescing chokes 910 pass to outlet conduits 914 and 916 and then are recombined in a downstream multiphase flow by a recombination junction 918. However, now the multiphase flow is at a substantially lower pressure and, ideally, with much larger droplets of oil and water entrained in the multiphase flow. Or at least, the droplets will be larger than if conventional pressure reducing flow control devices had been used.

A controller unit 920 receives pressure readings from pressure sensors 922 and 924 which are incorporated into coalescing chokes 906 and 910, or elsewhere in the appropriate gas and liquid flow streams. These readings are used to control signals to motors 926, 928 in coalescing chokes 906 and 910 to adjust the number of orifices 226 exposed by a plunger assembly 216 through which fluid can flow and pressure let down such that fluids of generally equal pressure are delivered to recombinant junction 912.

As an alternative to recombinant junction 912, another coalescing device or an eductor might be used. This separator/choke approach might be best applied when the choke can be at or near a manifold rather than at a wellhead, since control systems, etc., are already generally located in this vicinity. The gas/liquid separator could be incorporated into a manifold or as part of a distribution manifold system if, for instance, it is necessary to split flows in a controlled manner to parallel processing units. A wellhead application where this type of separation approach might warrant the extra expense of using such a system occurs where there are oils that foam or emulsify easily and it is highly desirable to limit the amount of emulsification.

A simplified separation/choke system, made in accordance with the principles of this invention, could be used on a wellhead or other remote location by employing a fixed configuration with no controls or include controls which draw power from solar cells or hydraulically from the production fluid. Such power sources would allow for use of the flow conditioning apparatus in remote locations away from readily available sources of electrical or other power.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method of separating liquid components of differing densities from a fluid mixture, the method comprising the steps of:

passing a fluid mixture having liquid components of differing densities through a flow coalescing apparatus, the flow coalescing apparatus including a flow control mechanism and a swirl chamber having an inlet and an outlet, the flow control mechanism adjustably controlling the rate of flow through the flow coalescing apparatus while the fluid mixture is helically swirled within the swirl chamber about a swirl axis to induce droplets of at least one of the liquid components to coalesce; and passing the fluid mixture to a cooperating liquid separator apparatus wherein the liquid components of differing densities are separated with the efficiency of the separator apparatus being enhanced by the existence of the coalesced droplets created by the flow coalescing apparatus.

2. The method of claim wherein the liquids components, which are separated, are received from a wellbore.

3. The method of claim 1 wherein:
   the swirl chamber is annular and is at least partially formed by cooperating inner and outer cylindrical walls.

4. The method of claim 3 wherein:
   at least one of the inner and outer cylindrical walls includes at least one of the inlet and the outlet; and
   at least one of the inlet and the outlet are configured to direct fluid flowing therethrough both circumferentially about the swirl axis and downstream at an acute angle $\theta$ relative to a plane perpendicular to the swirl axis such that the fluid mixture is helically swirled within the swirl chamber about the swirl axis to induce droplets of at least one of the liquid components to coalesce.

5. The method of claim 1 wherein:
   the one of the inlet and the outlet are configured to direct fluid flowing therethrough both circumferentially about the swirl axis and downstream at an acute angle $\theta$ relative to a plane perpendicular to the swirl axis such that the fluid mixture is helically swirled within the swirl chamber about the swirl axis to induce droplets of at least one of the liquid components to coalesce.

6. The method of claim 1 wherein:
   one of the inlet and the outlet includes a plurality of orifices; and
   the orifices are elongate and curved in periphery and direct the fluid mixture passing therethrough to spiral about the swirl axis.

7. The method of claim 6 wherein:
   the flow coalescing apparatus acts as a choke to substantially reduce the pressure of the fluid mixture passing through the flow coalescing apparatus.

8. The method of claim 1 wherein:
   the flow control mechanism includes a movable closure to control the rate of flow through at least one of the inlet and the outlet.

9. The method of claim 1 wherein:
   the flow control mechanism includes a plunger which cooperates with one of the inlet and the outlet to control the rate of flow through the flow conditioner.

10. The method of claim 1 wherein:
    the swirl chamber is at least partially formed by a cylinder and one of the inlet and the outlet includes a plurality of orifices which are configured to direct the fluid mixture to flow generally circumferentially about the swirl axis to create a helical flow.

11. The method of claim 10 wherein:
    the flow control apparatus is disposed down hole in a wellbore; and
    a fluid mixture enters the orifices and swirls to separate oil and water received from an oil production zone in the wellbore.

12. A method of separating liquid components of differing densities from a fluid mixture, the method comprising the steps of:

passing a fluid mixture having liquid components of differing densities through a flow coalescing apparatus, the flow coalescing apparatus including a first cylindrical wall which at least partially defines a swirl chamber which is coaxial with a swirl axis, the cylindrical wall including at least one of an inlet and an outlet which is configured to direct fluid flowing therethrough both circumferentially about the swirl axis and downstream at an acute angle $\theta$ relative to a plane perpendicular to the swirl axis such that the fluid mixture is helically swirled within the swirl chamber about the swirl axis to induce droplets of at least one of the liquid components to coalesce; and passing the fluid mixture to a cooperating liquid separator apparatus wherein the liquid components of differing densities are separated with the efficiency of the separator apparatus being enhanced by the existence of the coalesced droplets created by the flow coalescing apparatus.

13. The method of claim 12, wherein:
    the angle $\theta$ is between 0–90°.

14. The method of claim 12 wherein:
    the angle $\theta$ is between 0–30°.

15. The method of claim 12 wherein:
    the angle $\theta$ is between 5–15°.

16. The method of claim 12 wherein:
    the flow coalescing apparatus includes a second cylindrical wall which is coaxial with the swirl axis and cooperates with the first cylindrical wall to form the swirl chamber there between, and one of the inlet and the outlet is formed in the first cylindrical wall and the other of the inlet and outlet is formed in the second cylindrical wall.

17. The method of claim 12 wherein:

one of the inlet and the outlet includes a plurality of orifices.

18. The method of claim 17 wherein:

at least one of the plurality of orifices has an oblong periphery.

19. The method of claim 17 wherein:

at least one of the plurality of orifices has a periphery which is generally elliptical and oblong in shape and directs fluid to flow helically downstream relative to the swirl axis.

20. The method of claim 17 wherein:

the plurality of orifices are arranged in a spiral pattern in the first cylindrical wall.

21. The method of claim 12 wherein:

both the inlet and the outlet include a plurality of orifices.

22. The method of claim 21 wherein:

the flow coalescing apparatus has a flow control mechanism which includes a plunger which moves relative to one of the inlet and outlet openings to control the rate of flow through the flow coalescing apparatus.

23. The method of claim 12 wherein:

the flow coalescing apparatus has a flow control mechanism which includes a movable closure to control the rate of flow through the flow coalescing apparatus.

* * * * *